US008719269B2

(12) United States Patent
Sekiguchi et al.

(10) Patent No.: US 8,719,269 B2
(45) Date of Patent: May 6, 2014

(54) CONFIGURATION INFORMATION MANAGEMENT DEVICE, DISTRIBUTED INFORMATION MANAGEMENT SYSTEM, AND DISTRIBUTED INFORMATION MANAGEMENT METHOD

(75) Inventors: Atsuji Sekiguchi, Kawasaki (JP); Yuji Wada, Kawasaki (JP); Masazumi Matsubara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 11 days.

(21) Appl. No.: 12/985,454

(22) Filed: Jan. 6, 2011

(65) Prior Publication Data
US 2011/0179031 A1 Jul. 21, 2011

(30) Foreign Application Priority Data
Jan. 21, 2010 (JP) ................................ 2010-011417

(51) Int. Cl.
*G06F 7/00* (2006.01)
*G06F 17/30* (2006.01)
(52) U.S. Cl.
USPC .......................................... 707/737; 707/802
(58) Field of Classification Search
USPC .................... 707/706, 736, 737, 758, 802
See application file for complete search history.

(56) References Cited

U.S. PATENT DOCUMENTS 5,806,069 A * 9/1998 Wakiyama et al. ..................... 1/1
5,819,258 A * 10/1998 Vaithyanathan et al. ...... 707/692
7,526,462 B2 * 4/2009 Sakurai et al. .................. 706/20
8,082,222 B2 * 12/2011 Rangarajan et al. .......... 707/609
8,112,451 B1 * 2/2012 Graham et al. ............... 707/802
2007/0294237 A1 12/2007 John et al.
2009/0307262 A1 * 12/2009 Jeong et al. ............... 707/103 R
2009/0319559 A1 12/2009 Westerfeld et al.
2010/0185658 A1 * 7/2010 Kowalski ...................... 707/769

FOREIGN PATENT DOCUMENTS

| JP | 2004-272369 A | 9/2004 |
| JP | 2008-238667 A | 10/2008 |
| JP | 2009-169863 A | 7/2009 |

OTHER PUBLICATIONS

Great Britain Search Report mailed May 13, 2011 for corresponding Great Britain Application No. 1100187.2.

* cited by examiner

*Primary Examiner* — Md. I Uddin
(74) *Attorney, Agent, or Firm* — Fujitsu Patent Center

(57) ABSTRACT

A configuration information management device includes a configuration information storage unit for storing a configuration item indicative of information about a target of management, and an item relationship indicative of information about a connection between configuration items independently of a different configuration information management device. When a request to enter a cluster is accepted that is a group of a configuration item and an item relationship connected together, the configuration information management device determines a destination to store the cluster, and controls to cause the configuration information storage unit or the different configuration information management device to store the cluster. When a search request to search for a configuration item or an item relationship is accepted, the configuration information management device specifies a place where a cluster containing the target of the search is stored, and retrieves the configuration item or the item relationship targeted for the search from the storage place of the cluster.

6 Claims, 23 Drawing Sheets

FIG.3

| KEY | VALUE |
|---|---|
| 51 | CL1 |
| 55 | CL1 |
| 22 | CL3 |
| 11 | CL4 |
| : | : |

FIG.4

| CLUSTER | FCMDB ID |
|---|---|
| CL1 | 1 |
| CL2 | 4 |
| CL3 | 2 |
| : | : |

FIG.5

| CLUSTER | COUNT |
|---|---|
| CL1 | 105 |
| CL2 | 31 |
| CL3 | 42 |
| : | : |

FIG.6

| NAME | VALUE |
|---|---|
| SIZE | 4 |
| SIZE BEFORE INTEGRATION | 3 |
| AVERAGE NUMBER OF SUBQUERIES BEFORE INTEGRATION | 2.2 |
| TOTAL NUMBER OF QUERIES | 100 |
| TOTAL NUMBER OF SUBQUERIES | 150 |
| AVERAGE NUMBER OF SUBQUERIES | 1.5 |
| UPPER LIMIT OF CLUSTER SIZE | 4 |

FIG.9
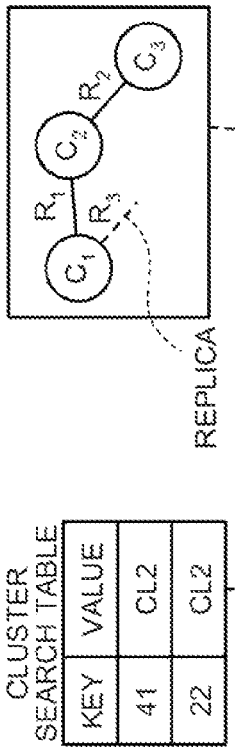
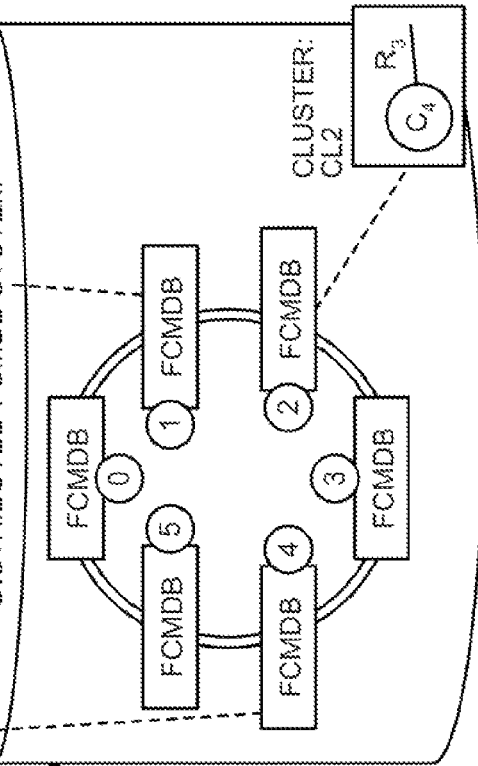

CONFIGURATION INFORMATION MANAGEMENT DEVICE, DISTRIBUTED INFORMATION MANAGEMENT SYSTEM, AND DISTRIBUTED INFORMATION MANAGEMENT METHOD

CROSS-REFERENCE TO RELATED APPLICATION

This application is based upon and claims the benefit of priority of the prior Japanese Patent Application No. 2010-011417, filed on Jan. 21, 2010, the entire contents of which are incorporated herein by reference.

FIELD

The embodiments discussed herein are directed to a configuration information management device, a distributed information management system, and a distributed information management method.

BACKGROUND

Open systems and multi-vendor systems have been the recent trends of IT systems, and IT systems have grown in scale and complexity as a result of increasing number of servers and increasing storage volume. This leads not only to higher operational costs but also to frequent occurrence of system shutdown and lower quality service due to human errors. In order to prevent these problems, importance should be placed on management of configuration information of IT systems including servers, storages and applications.

A database, more specifically what is called an MDR (management data repository), is known as a device to manage configuration information of an IT system. The MDR stores operations management data of an IT system, and corresponds to a database of operations management middleware.

The operation of a data center requires operations management middleware pieces optimized for corresponding management jobs including server management, network management, service management, and asset management. The operations management middleware pieces include their respective MDRs into which configuration information about the corresponding jobs are entered. That is, one MDR manages configuration information independently of a different MDR. Accordingly, in some cases, access to MDRs should be made in respective ways, or the MDRs store configuration information in respective formats. Thus, an actual situation is that the MDRs cannot be linked with one another without human intervention.

In response, a distributed information management system has been developed that includes a database called FCMDB (federated configuration management database) in which configuration information of various types spreading over a plurality of MDRs are virtually united. As an example, the distributed information management system illustrated in FIG. 24 includes a plurality of MDRs and an FCMDB that are connected through a network. FIG. 24 is a diagram illustrating the FCMDB.

The MDRs each manage information such as that about the structure of a device existing in an IT system. The MDRs handle data of respective types and respective amounts. As a specific example, as illustrated in FIG. 14, an MDR 1 manages design information, an MDR 2 manages product information, an MDR 3 manages quality information, and an MDR 4 manages configuration information.

The FCMDB integrates configuration information about one object that is managed separately in the plurality of MDRs, and manages the integrated configuration information. More specifically, the FCMDB manages configuration items (CIs) of an IT system including a device, software and datalog, and relationships between the CIs (hereinafter simply referred to as "relationships"). In the example of FIG. 14, a CI "C" managed in the FCMDB is integrated data of design information C" stored in the MDR 1, quality information C^ stored in the MDR 3, and configuration information C' stored in the MDR 4.

As described, the FCMDB integrates configuration information about one object that is managed separately in the plurality of MDRs, and manages the integrated configuration information. Accordingly, in all situation of the system operation including application of patches and hardware maintenance, an operator such as a system administrator is allowed to easily understand the overall structure of the IT system by referring to the configuration information virtually integrated by the FCMDB.

A distributed FCMDB system with a plurality of FCMDBs is known that is intended to enhance scalability. In the distributed FCMDB system illustrated in FIG. 25, information in MDRs are managed separately in a plurality of FCMDBs, and the plurality of FCMDBs perform data entry and data search independently of one another. FIG. 25 is a diagram illustrating the distributed FCMDB system. In the distributed FCMDB system, for entry of data containing three CIs ($C_1$, $C_2$, and $C_3$) and two relationships ($R_1$ and $R_2$) that are connected together, for example, $C_1$, $R_2$, $C_2$, $C_3$, and $R_1$ are entered separately into different FCMDBs as illustrated in FIG. 25.

A data entry process in the distributed FCMDB system will be described in detail by using FIG. 26. As illustrated in FIG. 26, for entry of data containing three CIs ($C_1$, $C_2$ and $C_3$) and two relationships ($R_1$ and $R_2$) that are connected together, the distributed FCMDB system obtains the respective hash values of the CIs and the relationships by using their respective IDs and the like. Then, by employing the respective hash values of the CIs and the relationships as their keys, the CIs and the relationships are entered separately into FCMDBs.

Referring to the example illustrated in FIG. 26, an FCMDB having accepted a request for entry calculates the hash value of $C_2$ as "51", and transfers the data of $C_2$ to an FCMDB "5" in charge of the hash value "51". Then, the FCMDB "5" in charge receives and stores the data of $C_2$. The FCMDB "5" in charge is assigned to a CI and a relationship the hash values of which range between "51" and "59". In the example illustrated in FIG. 26, the FCMDB "5" in charge stores $C_2$ and $R_1$ the hash values of which are "51" and "55", respectively.

Furthermore, graphs each with a CI as a node and a relationship as an edge are separately stored in the distributed FCMDB system. Accordingly, when an FCMDB accepts a search request from a client terminal, a search process is performed by making communications between FCMDBs. A search process in the distributed FCMDB system will be described in detail by using FIG. 27. The search process illustrated in FIG. 27 is performed when an FCMDB 5 in the distributed FCMDB system accepts a query "% C1/&R1/%C2/&R2/%C3" as a search request. The query "% C1/&R1/%C2/&R2/%C3" is intended to search for C2 related to C1 through R1, and to search for C3 related to C2 through R2.

The FCMDB 5 having accepted the search request searches for C1 at the beginning of the query and communicates with an FCMDB 4 holding C1, thereby obtaining the ID of C1. Then, the FCMDB 5 searches for R1 that recognizes the ID of C1 as its source CI or its target CI, and obtains the ID of C2 from the FCMDB 5 itself. Next, the FCMDB 5 having accepted the search request searches for R2 that recognizes the ID of C2 as its source CI or its target CI, and communicates with an FCMDB 1 holding R2, thereby obtaining the ID of C3. The FCMDB 5 thereafter specifies an FCMDB 2 holding C3 on the basis of the ID of C3, communicates with the FCMDB 2 to obtain the information about C3. Then, the FCMDB 5 outputs the data of C3 as a result of the search to the client terminal.

The aforementioned conventional technique is disclosed, for example, in Japanese Laid-open Patent Publication No. 2009-169863 and Japanese Laid-open Patent Publication No. 2004-272369.

In the technique of the aforementioned distributed FCMDB system, CIs and relationships are entered separately into different FCMDBs. Accordingly, a search process requires trace by following relationships. This means that a search process requires frequent communications between FCMDBs, leading to lower processing speed in the search process.

A processing speed in a search process may be increased by using a cache mechanism. By way of example, a result of a query is stored in a cache memory. If the same query is accepted in a next search process, the result of the query is read from the cache memory, and is output as a result of the search. However, the same query is not always accepted, and data in FCMDBs are updated. This leads to a low hit rate of the cache memory, so that a processing speed in a search process cannot be increased.

SUMMARY

According to an aspect of an embodiment of the invention, a configuration information management device includes a configuration information storage unit that stores a configuration item indicative of information about a target of management, and an item relationship indicative of information about a connection between the configuration items independently of a different configuration information management device; a storage controlling unit that, when a request to enter a cluster is accepted that is a group of the configuration item and the item relationship connected together, determines a destination to store the cluster, and controls to cause the configuration information storage unit or the different configuration information management device to store the cluster; and a search processing unit that, when a search request to search for the configuration item or the item relationship is accepted, specifies a place where a cluster containing the target of the search is stored and retrieves the configuration item or the item relationship targeted for the search from the storage place of the cluster.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating the data structure of a cluster search table;

FIG. 4 is a diagram illustrating the data structure of an FCMDB search table;

FIG. 5 is a diagram illustrating the data structure of a table of the frequency of reference made for cluster;

FIG. 6 is a diagram illustrating exemplary statistical information about a cluster;

FIG. 9 is a diagram illustrating a process for adding a new cluster;

DESCRIPTION OF EMBODIMENTS

Preferred embodiments of the present invention will be explained with reference to accompanying drawings.

[a] First Embodiment

Figure 1:
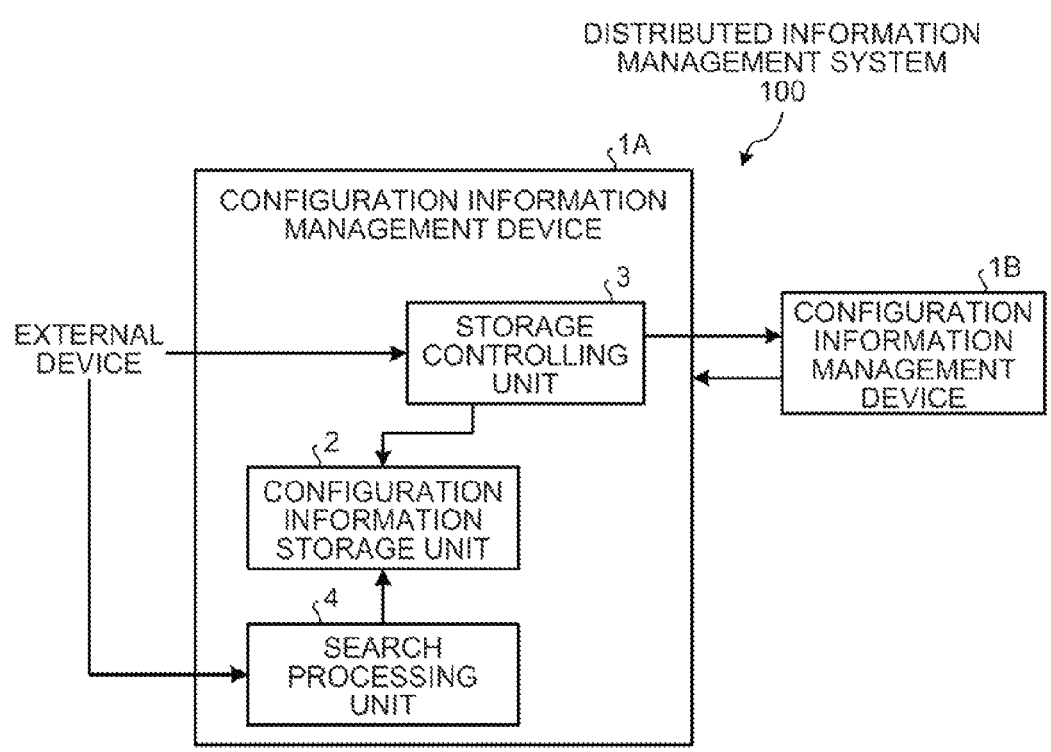
FIG. 1 is a block diagram illustrating the structure of a configuration information management device according to a first embodiment.

The structure of a configuration information management device according to a first embodiment will be described first by using FIG. 1. FIG. 1 is a block diagram illustrating the structure of the configuration information management device according to the first embodiment. As illustrated in FIG. 1, a distributed information management system 100 includes a plurality of configuration information management devices 1A and 1B that are connected to each other. The configuration information management device 1A includes a configuration information storage unit 2, a storage controlling unit 3, and a search processing unit 4.

The configuration information storage unit 2 stores a configuration item indicative of information about a target of management, and an item relationship indicative of information about a connection between configuration items independently of a different configuration information management device 1B. When a request to enter a cluster is accepted that is a group of a configuration item and an item relationship connected together, the storage controlling unit 3 determines a destination to store the cluster, and controls to cause the configuration information storage unit 2 or the other configuration information management device 1B to store the cluster.

When a search request to search for a configuration item or an item relationship is accepted, the search processing unit 4 specifies a place where a cluster including the target of the search is stored, and retrieves the configuration item or the item relationship targeted for the search from the storage place of the cluster.

That is, in the distributed information management system 100, a cluster as a group of a configuration item and an item relationship connected together is placed in one configuration information management device. This reduces the number of communications between FCMDBs in a search process, so that a processing speed in the search process is increased.

As described above, the configuration information management device 1A includes the configuration information storage unit 2 that stores a configuration item indicative of information about a target of management, and an item relationship indicative of information about a connection between configuration items independently of a different configuration information management device. When a request to enter a cluster is accepted that is a group of a configuration item and an item relationship connected together, the configuration information management device 1A determines a destination to store the cluster, and controls to cause the configuration information storage unit 2 or the other configuration information management device 1B to store the cluster. When a search request to search for a configuration item or an item relationship is accepted, the configuration information management device 1A specifies a place where a cluster including the target of the search is stored, and retrieves the configuration item or the item relationship targeted for the search from the storage place. This reduces the number of communications between FCMDBs in a search process, so that a processing speed in the search process is increased.

[b] Second Embodiment

Structure of FCMDB

Figure 2:
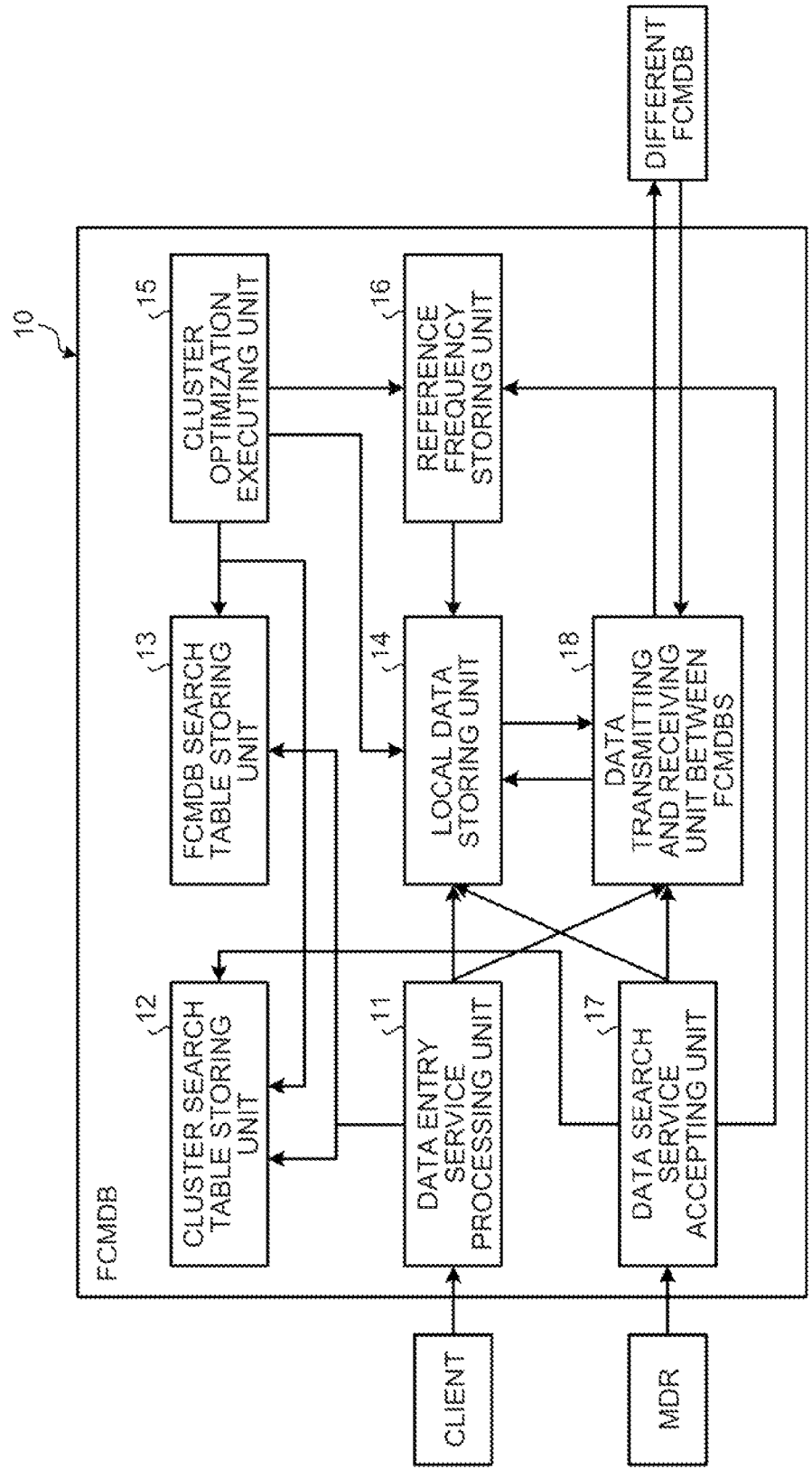
FIG. 2 is a block diagram illustrating the structure of an FCMDB according to a second embodiment.

The structure of an FCMDB will be described next by using FIG. 2. FIG. 2 is a block diagram illustrating the structure of an FCMDB according to a second embodiment. As illustrated in FIG. 2, an FCMDB 10 includes: a data entry service processing unit 11; a cluster search table storing unit 12; an FCMDB search table storing unit 13; a local data storing unit 14; a cluster optimization executing unit 15; a reference frequency storing unit 16; a data search service accepting unit 17; and a data transmitting and receiving unit 18 between FCMDBs. The FCMDB 10 is connected through a network to a client terminal, to an MDR, and to a different FCMDB. The operations of these units will be described next.

The cluster search table storing unit 12 stores a cluster search table containing correspondence between hash values of CIs and relationships, and cluster IDs for uniquely identifying clusters each as a group of a CI and an item relationship connected together. More specifically, as exemplified in FIG. 3, the cluster search table storing unit 12 stores correspondence between "key" indicating the hash values of CIs and relationships, and "value" indicating cluster IDs. FIG. 3 is a diagram illustrating the data structure of the cluster search table.

The FCMDB search table storing unit 13 stores cluster IDs and the IDs of FCMDBs holding the clusters. More specifically, as exemplified in FIG. 4, the FCMDB search table storing unit 13 stores correspondence between "Cluster" indicating cluster IDs for uniquely identifying clusters, and "FCMDB ID" for uniquely identifying FCMDBs holding the clusters. FIG. 4 is a diagram illustrating the data structure of the FCMDB search table.

The reference frequency storing unit 16 stores the frequency of reference made across clusters. More specifically, as exemplified in FIG. 5, the reference frequency storing unit 16 stores correspondence between "Cluster" indicating cluster IDs for uniquely identifying clusters, and "count" indicating the frequency of reference made across the clusters (the number of subqueries issued).

The local data storing unit 14 stores a CI indicating information about a target of management, and a relationship indicating a connection between CIs. More specifically, the local data storing unit 14 stores a CI or a relationship caused to be stored by the data entry service processing unit 11 described later. A relationship holds "source" and "target" as data that indicate CIs connected thereto.

The local data storing unit 14 also stores statistical information about a cluster stored in the local data storing unit 14 itself. More specifically, as exemplified in FIG. 6, the local data storing unit 14 stores "size" indicating the number of CIs in the cluster, "size before integration" indicating a size before integration, and "average number of subqueries before integration" indicating an average number of subqueries before integration. As exemplified in FIG. 6, the local data storing unit 14 further stores "total number of queries" indicating the total number of queries that is increased by one each time a query about the cluster is made. As exemplified in FIG. 6, the local data storing unit 14 also stores "total number of subqueries". "Total number of subqueries" is increased by one if a query falls within the cluster. If a subquery issued refers to a different cluster as well as the cluster stored in the local data storing unit 14 itself, "total number of subqueries" is increased each time such a subquery is issued.

As exemplified in FIG. 6, the local data storing unit 14 further stores "average number of subqueries" indicating a value obtained by dividing the total number of subqueries by the total number of queries, and "upper limit of cluster size" indicating the upper limit of a cluster size. "Upper limit of cluster size" has an initial value "3", for example, and is changed by the cluster optimization executing unit 15 described later.

When a request to enter a cluster is accepted that is a group of a CI and a relationship connected together, the data entry service processing unit 11 determines a destination to store the cluster. Then, the data entry service processing unit 11 controls to cause the local data storing unit 14 or a different FCMDB to store the cluster.

The data entry service processing unit 11 also determines each destination to store a CI and a relationship in the stored group of a CI and a relationship, and controls to store the determined destination into the cluster search table and the FCMDB search table of a destination of a group of a CI and a relationship.

Figure 7:
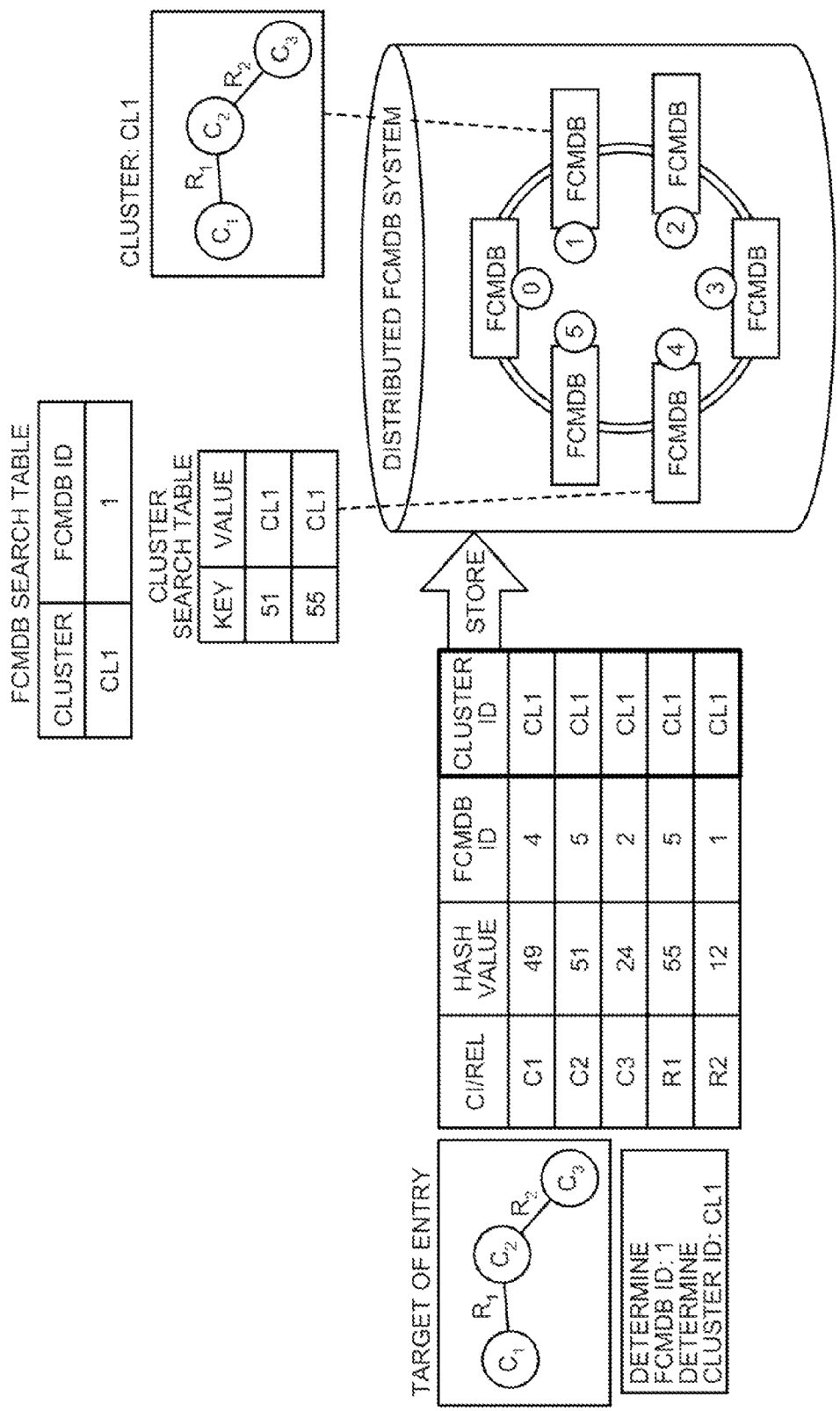
FIG. 7 is a diagram illustrating an entry process of a cluster.

A cluster entry process will be described in more detail by using the example illustrated in FIG. 7. FIG. 7 is a diagram illustrating an entry process of a cluster. In the example illustrated in FIG. 7, a cluster is an aggregate of data targeted for the entry including three CIs ($C_1$, $C_2$, $C_3$) and two relationships ($R_1$, $R_2$) connected together.

When a request to enter the three CIs ($C_1$, $C_2$, $C_3$) and the two relationships ($R_1$, $R_2$) targeted for the entry is accepted, the FCMDB 10 searches the cluster search table stored in the cluster search table storing unit 12 for the targets of the entry to determine whether the cluster targeted for the entry already exists in an FCMDB. If the cluster to which the targets of the entry belong does not exist in the FCMDB, the FCMDB 10 having accepted the request for the entry randomly determines an FCMDB ID to manage the cluster. The FCMDB 10 also determines a cluster ID from the FCMDB ID thereby determined and a current time. In the example illustrated in FIG. 7, the determined FCMDB ID is "1", and the determined cluster ID is "CL1".

Then, the FCMDB 10 stores the cluster into an FCMDB with the FCMDB ID "1", and stores correspondence between CL1 and FCMDB 1 into the FCMDB search table. Next, the FCMDB 10 calculates the respective hash values of the CIs and the relationships in the cluster, and determines an FCMDB to manage the CIs and the relationships by using the hash values. As exemplified in FIG. 7, if the respective hash values of C2 and R1 are "51" and "55", the FCMDB 10 determines an FCMDB with an FCMDB ID "5" as an FCMDB to manage C2 and R1.

The FCMDB 10 thereafter controls to enter the cluster ID into the cluster search table of the FCMDB thereby determined. As an example, the FCMDB 10 controls to store correspondence between the hash value "51" of C2 and the cluster ID "CL1" into the cluster search table of the FCMDB with the FCMDB ID "5". That is, an FCMDB to take charge of a hash value is determined in the same manner as in the conventional technique. However, unlike the conventional technique, an FCMDB stores not the data of a CI or a relationship itself but a cluster ID. An FCMDB storing a cluster containing the data of a CI or a relationship is determined during a search process.

Figure 8:
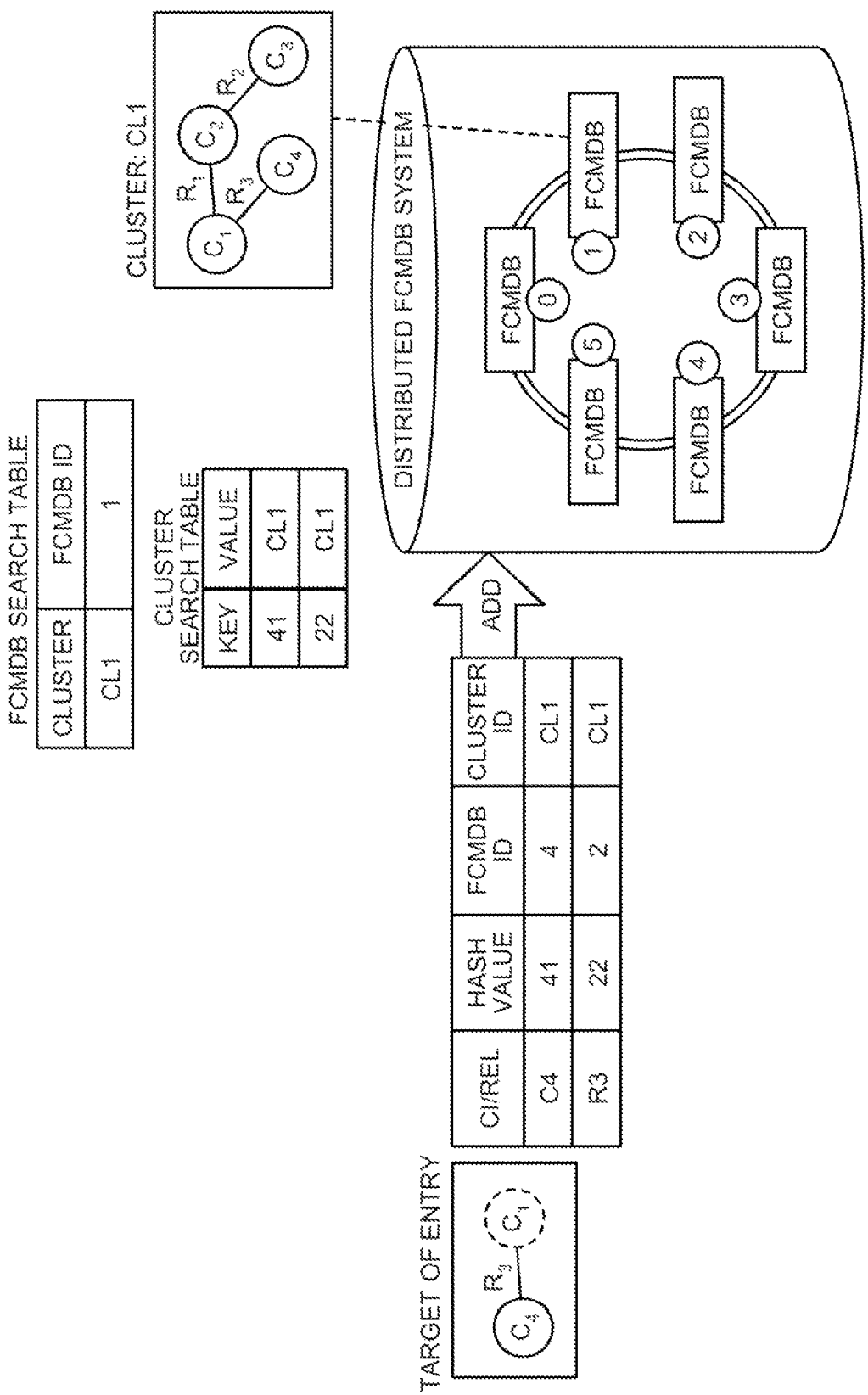
FIG. 8 is a diagram illustrating a process for adding information to an existing cluster.

If a CI as a "source" or a "target" of a relationship targeted for entry already exists, the FCMDB 10 adds the target of the entry to a cluster to which the CI belongs. A process for adding information to an existing cluster will be explained by using FIG. 8. As illustrated in FIG. 8, when a request to enter a CI "C4" and a relationship "R3" targeted for entry is accepted, the FCMDB 10 searches the cluster search table stored in the cluster search table storing unit 12 for the targets of the entry to determine whether a cluster to which the targets of the entry belong already exists in an FCMDB.

If the cluster to which the targets of the entry belong already exists in the FCMDB, the FCMDB 10 stores C4 and R3 into the FCMDB "1" with the FCMDB ID "1", thereby adding C4 and R3 to the cluster to which C4 and R3 belong.

Next, the FCMDB 10 calculates the respective hash values of C4 and R3, and determines an FCMDB to manage C4 and R3 by using the calculated hash values. As exemplified in FIG. 8, if the respective hash values of C4 and R3 are "41" and "22", the FCMDB 10 determines an FCMDB with an FCMDB ID "4" as an FCMDB to manage C4, and determines an FCMDB with an FCMDB ID "2" as an FCMDB to manage R3.

The FCMDB 10 thereafter controls to enter a cluster ID into the cluster search table of the FCMDBs thereby determined. As an example, the FCMDB 10 controls to store correspondence between the hash value "41" of C4 and the cluster ID "CL1" into the cluster search table of the FCMDB with the FCMDB ID "4".

If a CI as a "source" or a "target" of a relationship targeted for entry already exists, but if addition of the target of the entry makes the size of the cluster "CL1" exceed its upper limit, the FCMDB 10 does not add the target of the entry to the cluster to which the CI belongs. A process for adding information to a new cluster will be explained by using FIG. 9. FIG. 9 is a diagram illustrating a process for adding a new cluster. As illustrated in FIG. 9, when a request to enter the CI "C4" and the relationship "R3" targeted for entry is accepted, the FCMDB 10 searches the cluster search table stored in the cluster search table storing unit 12 for the targets of the entry to determine whether a cluster to which the targets of the entry belong already exists in an FCMDB.

Here, it is assumed that a result of the search is such that the cluster "CL1" to which the targets of the entry belong exists in the FCMDB "1", but addition of C4 and R3 to the cluster "CL1" makes the size of the cluster "CL1" exceed its upper limit. In this case, the FCMDB 10 having accepted the request for the entry enters C4 and R3 into a new cluster "CL2", and enters a replica of R3 into the cluster "CL1". That is, only a replica of a relationship as an edge of a cluster is formed. This reduces an amount used in a storage region while increasing a processing speed in a search process.

Referring back to FIG. 2, when a request to search for a CI or a relationship is accepted, the data search service accepting unit 17 specifies a place where a cluster containing the target of the search is stored, and retrieves the CI or the relationship targeted for the search from the storage place of the cluster.

More specifically, when a query formula is accepted as a search request from the client terminal, the data search service accepting unit 17 calculates the hash value of a CI at the beginning of the query. Then, the data search service accepting unit 17 obtains a cluster ID corresponding to the calculated hash value from the cluster search table of an FCMDB in charge of this hash value. Next, the data search service accepting unit 17 obtains an FCMDB ID corresponding to the cluster ID thereby obtained from the FCMDB search table, and transfers the query to an FCMDB with the FCMDB ID thereby obtained.

The FCMDB having accepted the query processes the query, and provides a result of the query to the FCMDB having accepted the search request. The FCMDB having accepted the query stores a cluster as a group of a CI and a relationship connected together, so that it is capable of processing the query without issuing a subquery. After receiving the result of the query, the data search service accepting unit 17 of the FCMDB having accepted the search request outputs the result of the query as a result of the search to the client terminal.

Figure 10:
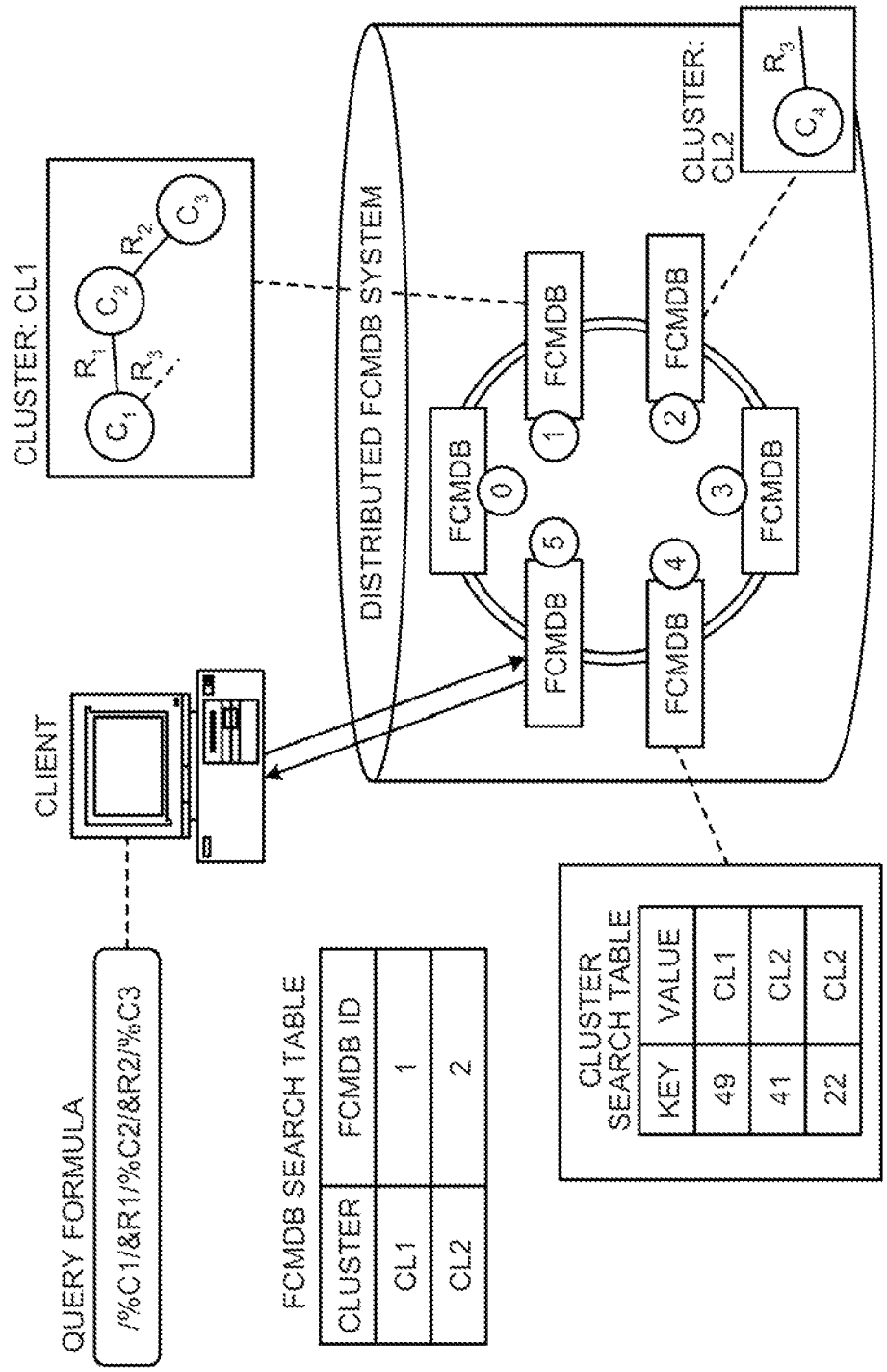
FIG. 10 is a diagram illustrating a search process completed within one FCMDB.

Next, a search process will be explained by using the example illustrated in FIG. 10. FIG. 10 is a diagram illustrating a search process completed within one FCMDB. As illustrated in FIG. 10, when a query formula "% C1/&R1/%C2/ &R2/%C3" is accepted as a search request from the client terminal, the FCMDB "5" calculates the hash value of the CI "C1" at the beginning of the query as "49", and obtains the cluster ID "CL1" corresponding to the calculated hash value from the cluster search table of the FCMDB "4". Next, the FCMDB "5" obtains the FCMDB ID "1" corresponding to the cluster ID "CL1" from the FCMDB search table, and transfers the query to the FCMDB with the FCMDB ID "1".

The FCMDB "1" having accepted the query processes the query, and provides a result of the query to the FCMDB "5" having accepted the search request. After receiving the result of the query, the FCMDB "5" having accepted the search request outputs the result of the query as a result of the search to the client terminal. That is, the FCMDB "1" completes the search process without issuing a subquery to obtain the CI "C3" as a result of the search, thereby increasing a processing speed in the search process.

Figure 11:
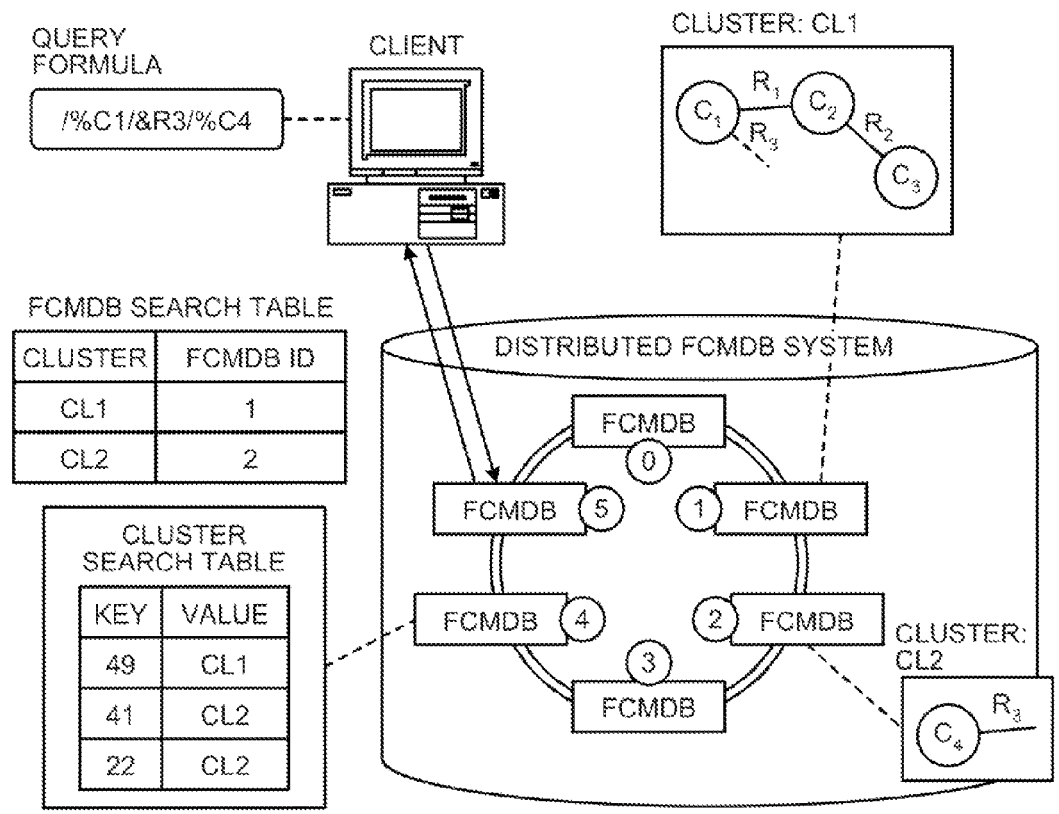
FIG. 11 is a diagram illustrating a search process conducted by multiple FCMDBs.

An FCMDB may make a query that refers to a plurality of clusters. A search process by an FCMDB in such a case will be explained by using FIG. 11. FIG. 11 is a diagram illustrating a search process conducted by a plurality of FCMDBs. As illustrated in FIG. 11, when a query formula "% C1/&R3/% C4" is accepted as a search request from the client terminal, the FCMDB "5" calculates the hash value of the CI "C1" at the beginning of the query as "49", and obtains the cluster ID "CL1" corresponding to the calculated hash value from the cluster search table of the FCMDB "4". Next, the FCMDB "5" obtains the FCMDB ID "1" corresponding to the cluster ID "CL1" from the FCMDB search table, and transfers the query to the FCMDB with the FCMDB ID "1".

The FCMDB "1" having accepted the query conducts a search by following the query formula. The cluster "CL1" does not contain data after R3. Accordingly, in this case, the FCMDB "1" divides the query, and forms a subquery starting from "% C4" in the query. Then, the FCMDB "1" calculates the hash value of the CI "C4" at the beginning of the subquery as "41", and obtains a cluster ID "CL2" corresponding to the calculated hash value from the cluster search table of the FCMDB "4". Next, the FCMDB "1" obtains the FCMDB ID "2" corresponding to the cluster ID "CL2" from the FCMDB search table, and transfers the subquery to the FCMDB with the FCMDB ID "2".

The FCMDB "2" having accepted the subquery processes the subquery to find C4 as a result of the query, and transmits C4 through the FCMDB "1" to the FCMDB "5". After receiving C4 as the result of the query, the FCMDB "5" outputs the result of the query as a result of the search to the client terminal.

The cluster optimization executing unit 15 is responsible for relocation of a cluster, integration of clusters, and division of a cluster. More specifically, for relocation of a cluster, the cluster optimization executing unit 15 calculates a sum of the frequency of reference made for the cluster by each FCMDB ID by using a table of the frequency of reference made for the cluster, stored in the reference frequency storing unit 16. If the sum of the frequency of reference by each FCMDB ID is equal to or larger than a predetermined threshold, and if the ID of an FCMDB in which the cluster is placed differs from that of an FCMDB that referred to the cluster with the highest frequency, the cluster is moved to the FCMDB with the highest frequency for relocation.

Figure 12:
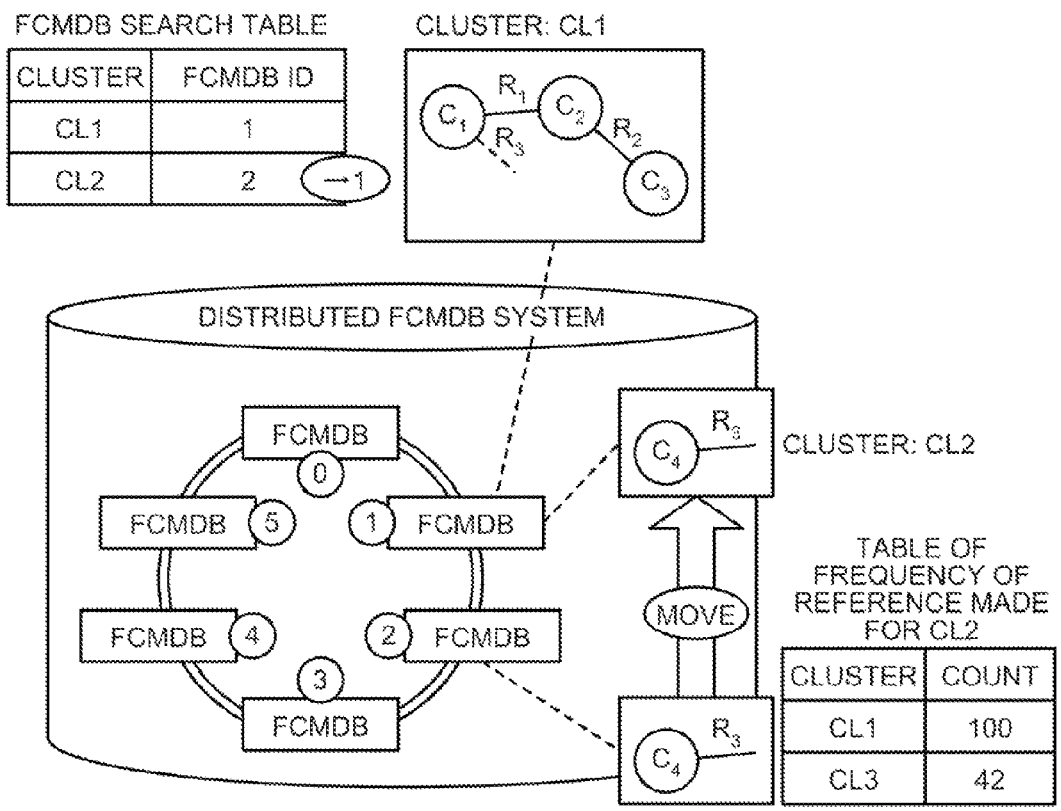
FIG. 12 is a diagram illustrating a relocation process of a cluster.

A relocation process of a cluster will be explained by using the example illustrated in FIG. 12. As illustrated in FIG. 12, the FCMDB 2 calculates a sum of the frequency of reference made for the cluster CL2 by each FCMDB ID by using a table of the frequency of reference made for the cluster CL2. Then, the FCMDB 2 determines that the sum of the frequency of reference made by the FCMDB ID "1" is equal to or larger than a threshold "100", and that the FCMDB ID "2" in which the cluster CL2 is placed differs from the FCMDB "1" that referred to the cluster CL2 with the highest frequency. In this case, the FCMDB 2 makes a copy of the cluster CL2 in the FCMDB "1". Next, the FCMDB 2 corrects the FCMDB search table such that the cluster CL2 is related with the FCMDB ID "1", and deletes the data of the cluster CL2 from the FCMDB 2.

Integration of clusters by the cluster optimization executing unit 15 is as follows. If a sum of the frequency of reference made for clusters by each FCMDB ID, determined by using a table of the frequency of reference made for the clusters, stored in the reference frequency storing unit 16, is equal to or larger than a predetermined threshold, and if the clusters are stored in the same FCMDB, these clusters are integrated.

Figure 13:
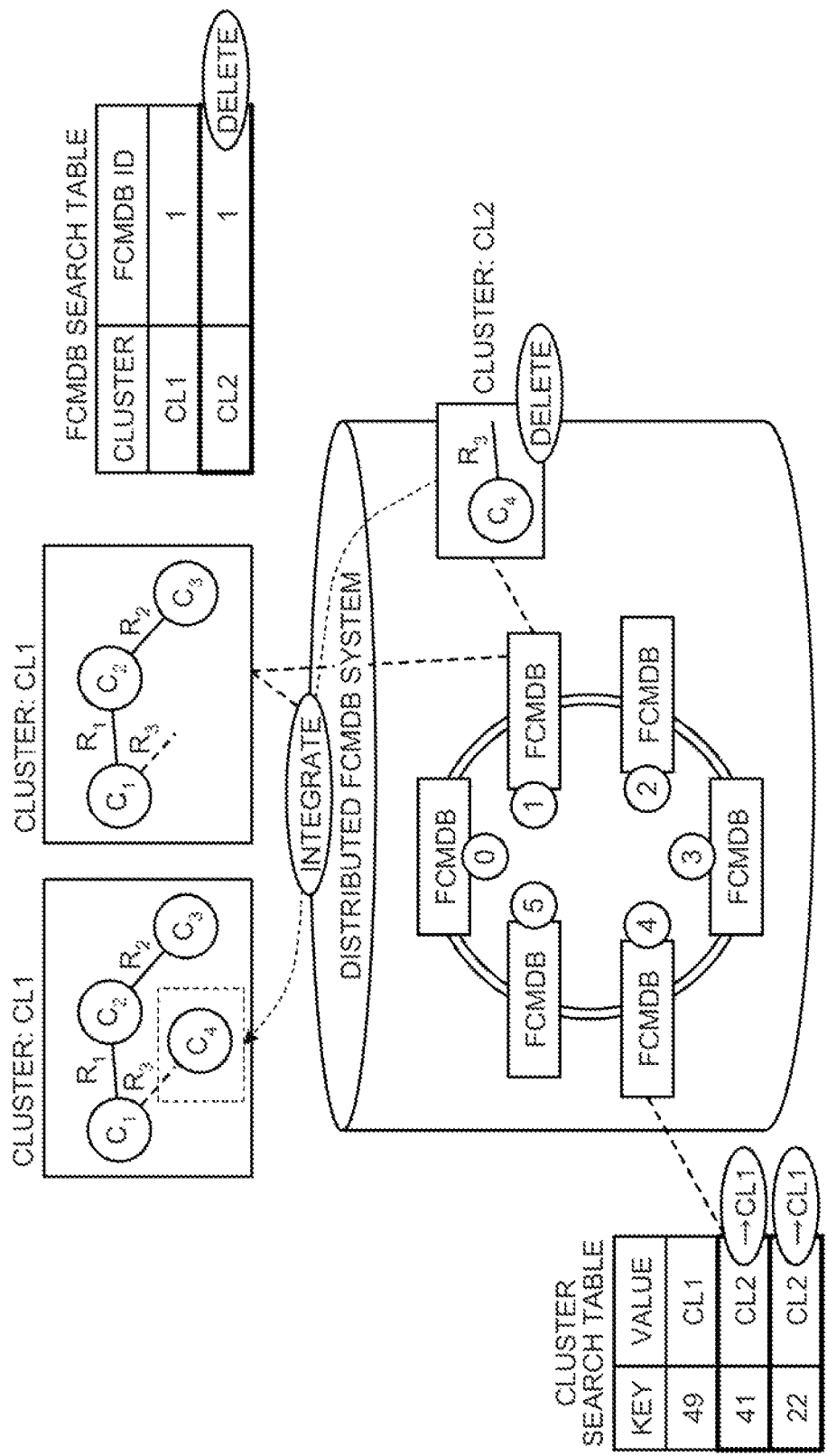
FIG. 13 is a diagram illustrating an integration process of clusters.

An integration process of clusters will be explained by using the example illustrated in FIG. 13. As illustrated in FIG. 13, the FCMDB 1 calculates a sum of the frequency of reference made for the cluster CL2 by each FCMDB ID by using a table of the frequency of reference made for the cluster CL2. Then, the FCMDB 1 determines that the sum of the frequency of reference made by an FCMDB with the FCMDB ID "1" is equal to or larger than a predetermined threshold. The FCMDB 1 also determines that the FCMDB ID "1" in which the cluster CL2 is placed is the same as the FCMDB "1" that referred to the cluster CL2 with the highest frequency.

In this case, the FCMDB 1 adds the element of the cluster CL2 to the cluster CL1, and corrects a cluster ID assigned to the data of the cluster CL2 from CL2 to CL1 in the cluster search table. The FCMDB 1 also deletes the data with the cluster ID CL2 from the FCMDB search table, and deletes the data of the cluster CL2 from the FCMDB 1. That is, clusters with high frequencies of reference are considered to be strongly related, and are integrated as one cluster.

If the size of a cluster after cluster integration exceeds its upper limit, the cluster optimization executing unit 15 divides the cluster on the basis of the frequency of reference made for a relationship in the cluster. The frequency of reference mentioned here indicates the frequency of reference made for a relationship while a query is processed. As an example, the cluster optimization executing unit 15 selects a CI from CIs in a cluster. The CI to be selected is such that it is connected to a relationship with a large sum of the frequency of reference. After selecting the CI, the cluster optimization executing unit 15 further selects relationships and CIs in descending order of frequency of reference made for relationship. Those selected so that the number of CIs does not exceed the upper limit of a cluster size are incorporated in a new cluster.

Figure 14:
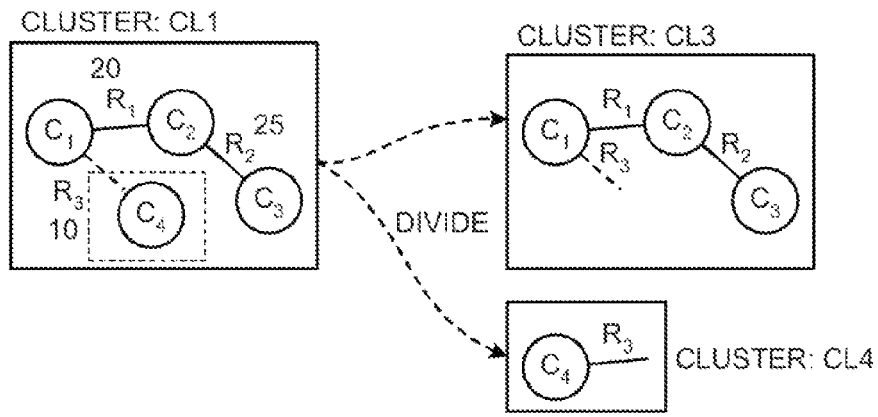
FIG. 14 is a diagram illustrating a division process of a cluster.

A division process of a cluster will be explained by using the example illustrated in FIG. 14. In the example illustrated in FIG. 14, the upper limit of a cluster size is "3", and the frequencies of reference made for the relationships R1, R2, and R3 are "20", "25", and "10", respectively. Accordingly, in the example of FIG. 14, with respect to the CIs C1 to C4 in a cluster, sums of the frequencies of reference made for relationships connected to these CIs are "30", "45", "25", and "10", respectively.

The cluster optimization executing unit 15 first selects "C2" with the highest frequency of reference made for relationships connected thereto. After selecting "C2", the cluster optimization executing unit 15 selects the relationship R2 with a high frequency of reference connected to selected "C2" and then C3, and thereafter selects R1 and then C1. Then, the number of CIs reaches the upper limit "3" of a cluster size. Accordingly, the cluster optimization executing unit 15 divides the cluster CL1 into a new cluster CL3 with C1, R1, C2, R2, and C3, and a replica of R3, and a new cluster CL4 with C4 and R3.

In response to an effect of reducing the number of subqueries, the cluster optimization executing unit 15 adjusts the upper limit of a cluster size after the cluster integration process and before the division process described above. As an example, the cluster optimization executing unit 15 determines whether the improvement rate of the number of subqueries is greater than a size increase rate. If the improvement rate of the number of subqueries is greater than a size increase rate, the cluster optimization executing unit 15 raises the upper limit of a cluster size. If the improvement rate of the number of subqueries is not greater than a size increase rate, the cluster optimization executing unit 15 lowers the upper limit of a cluster size. A size increase rate mentioned here is a value obtained by dividing a cluster size after cluster integration by a cluster size before the cluster integration. The improvement rate of the number of subqueries mentioned here is a value obtained by dividing the number of subqueries after integration by the number of subqueries before the integration.

Figure 15:
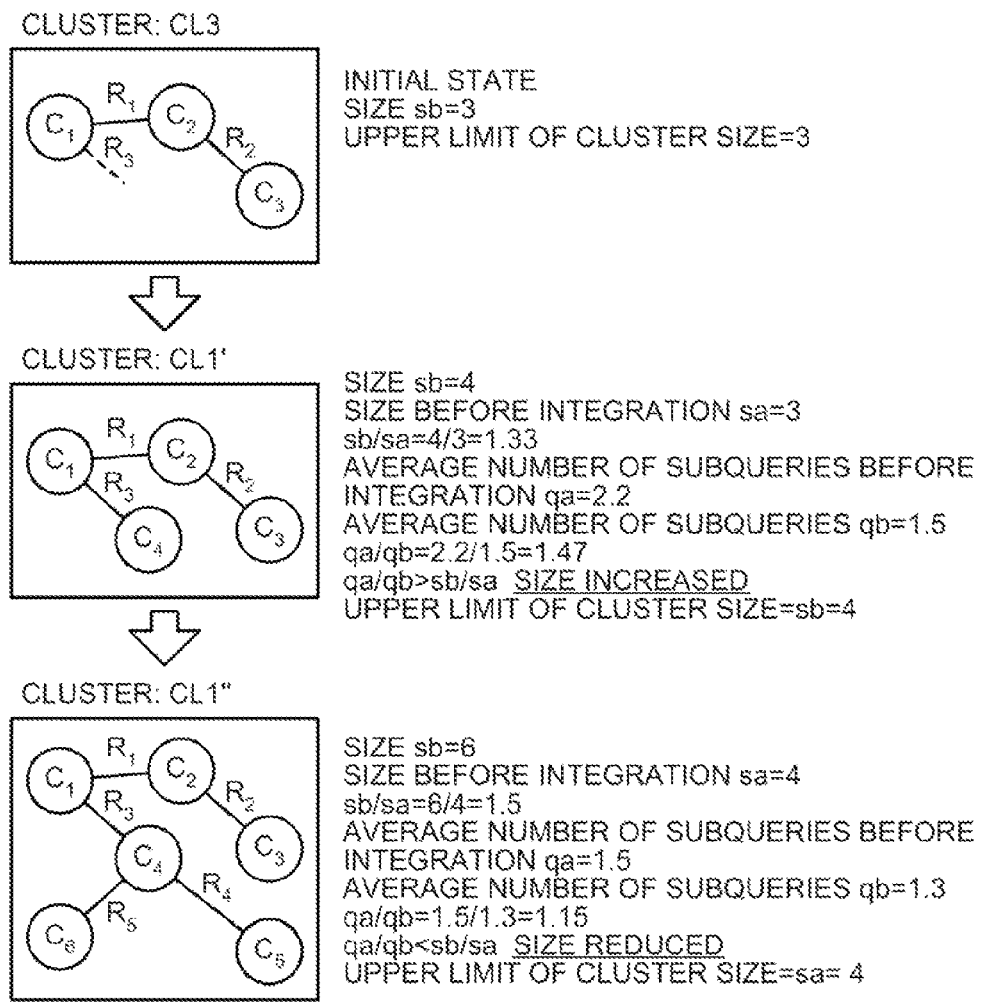
FIG. 15 is a diagram illustrating a process for determining the upper limit of a cluster size.

A process for determining the upper limit of a cluster size will be explained by using the example illustrated in FIG. 15. In the example of FIG. 15, an initial state of the cluster CL3 is such that a cluster size sb is "3", and the upper limit of a cluster size is "3". As a result of cluster integration, the cluster size sb becomes "4". At this time, a size sa before the integration is "3", and a size increase rate is calculated as sb/sa=1.33. Further, the average number of subqueries qa before the integration is "2.2", and the average number of subqueries qb is "1.5". Accordingly, in this case, the improvement rate of the number of subqueries is calculated as qa/qb=1.47. An FCMDB compares the size increase rate sb/sa="1.33" with the improvement rate of the number of subqueries qa/qb="1.47", and determines that the improvement rate of the number of subqueries is greater than the size increase rate. Accordingly, the FCMDB changes the upper limit of a cluster size from "3" to "4" that is a cluster size after the integration.

As a result of further cluster integration, the cluster size sb becomes "6". At this time, the size sa before the integration becomes "4", and a size increase rate is calculated as sb/sa=1.5. Further, the average number of subqueries qa before the integration becomes "1.5", and the average number of subqueries qb becomes "1.3". Accordingly, in this case, the improvement rate of the number of subqueries is calculated as qa/qb=1.15. The FCMDB compares the size increase rate sb/sa="1.5" with the improvement rate of the number of subqueries qa/qb="1.15", and determines that the improvement rate of the number of subqueries is smaller than the size increase rate. Accordingly, the FCMDB maintains the upper limit of a cluster size "4" at the size "4" before the integration. In this case, as the cluster size exceeds its upper limit, the FCMDB conducts the aforementioned division process.

Figure 16:
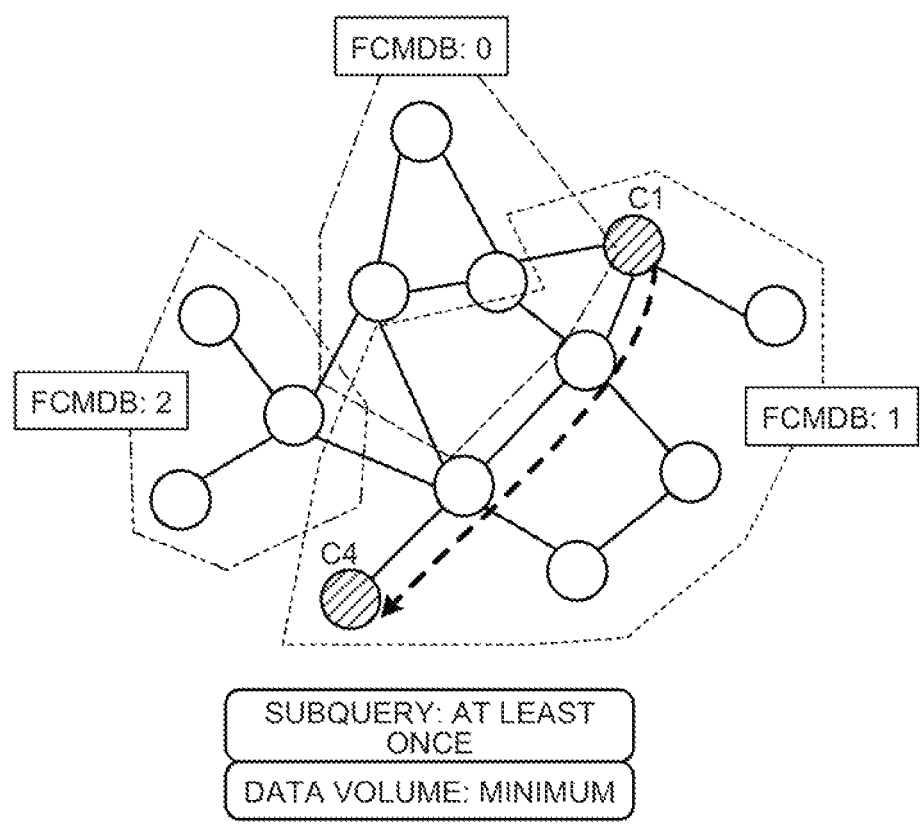
FIG. 16 is a diagram illustrating correspondence between clusters stored in FCMDBs, and subqueries required for search.

As described, strongly related groups of CIs and relationships are entered together. Accordingly, search for C4 from C1 that are placed in the same cluster in the FCMDB 1 requires issue of a subquery at least once. Further, FCMDBs do not store a replica of a CI or a relationship, keeping data volume at low. FIG. 16 is a diagram illustrating correspondence between clusters stored in FCMDBs, and subqueries required for search.

Process by FCMDBs

Figure 17:
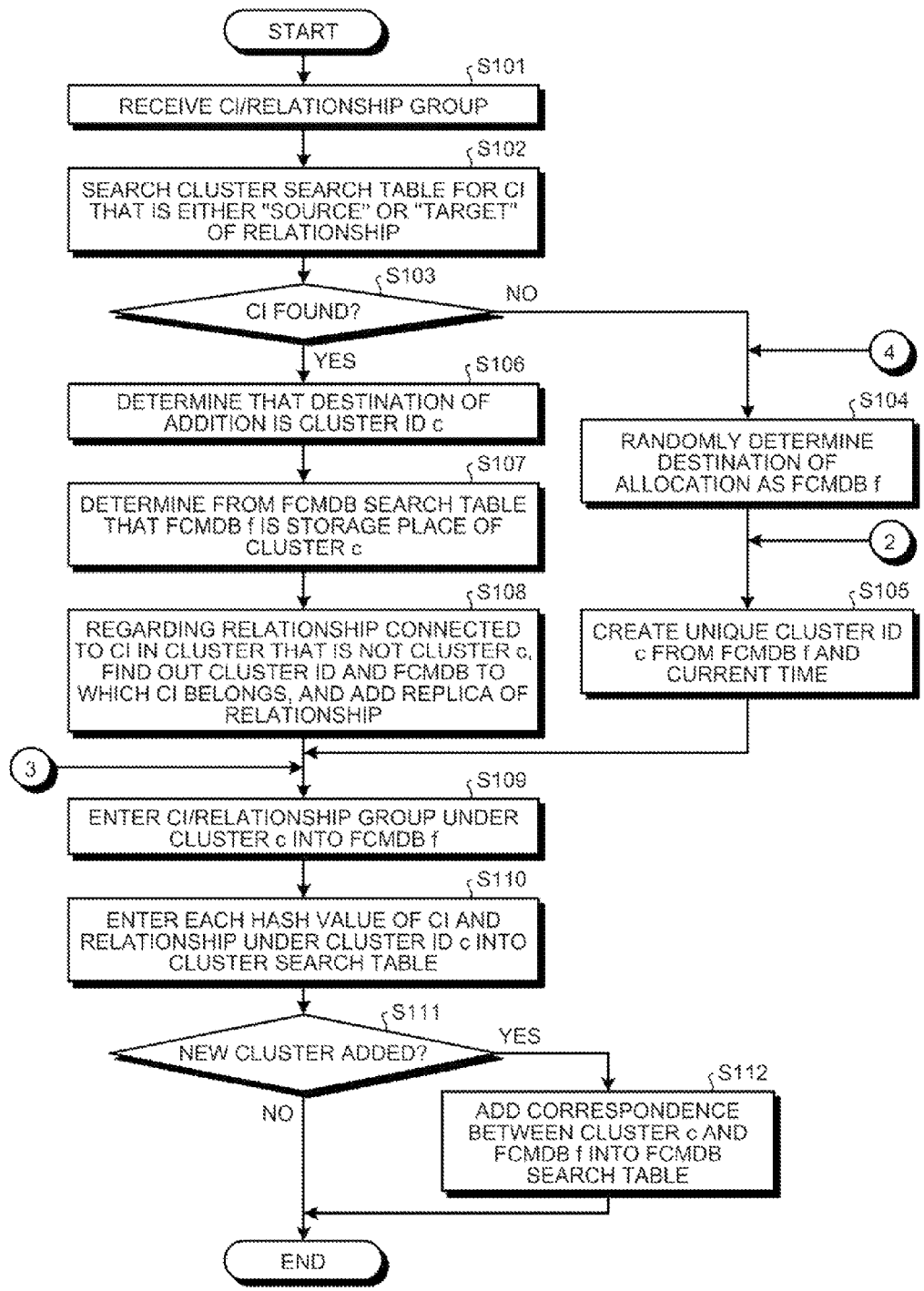
FIG. 17 is a flow diagram illustrating an entry process.
Figure 18A:
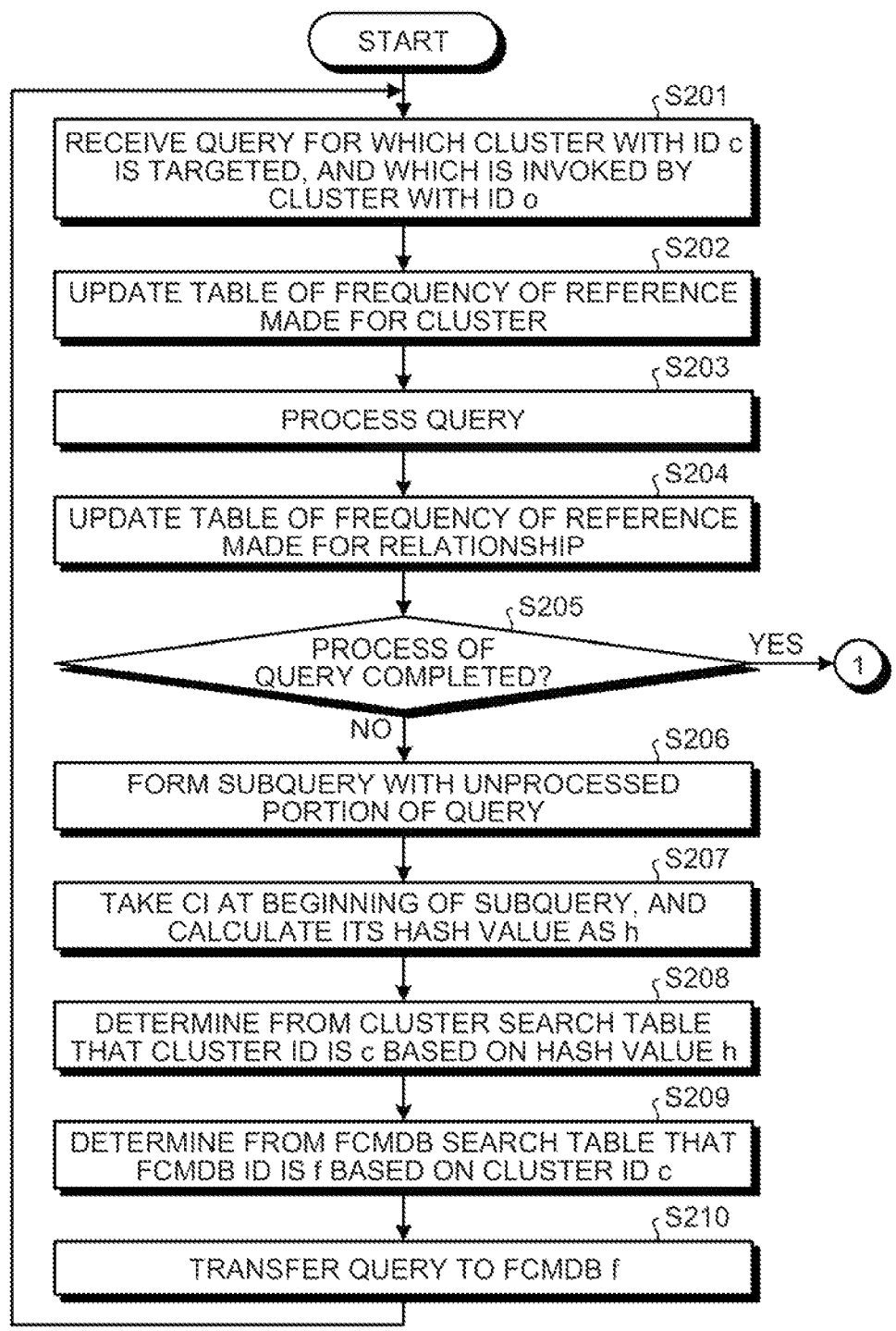
FIG. 18A is a flow diagram illustrating a search process.
Figure 18B:
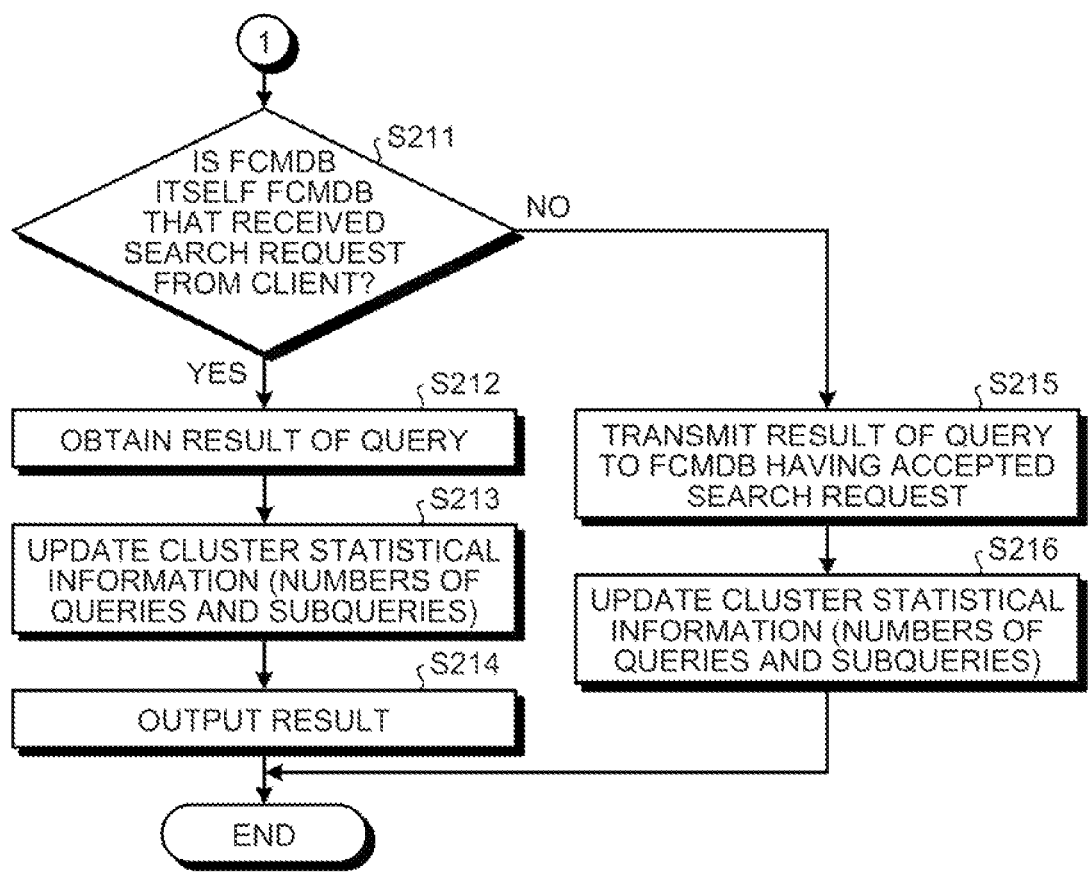
FIG. 18B is a flow diagram illustrating a search process.
Figure 19:
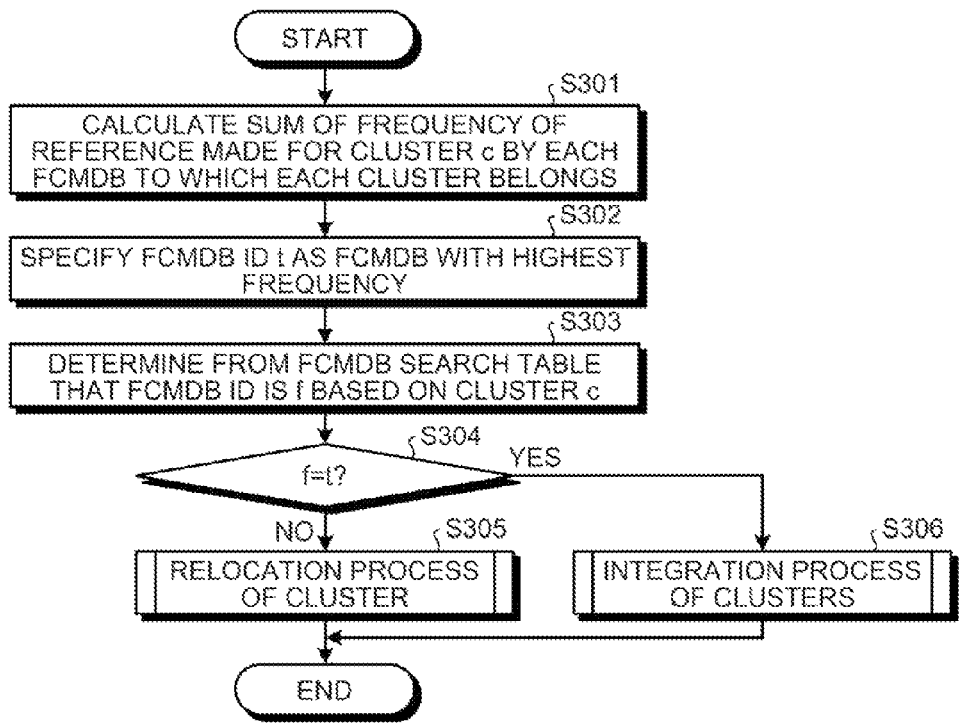
FIG. 19 is a flow diagram illustrating a process for determining whether the relocation process of a cluster or the integration process of clusters is conducted.
Figure 20:
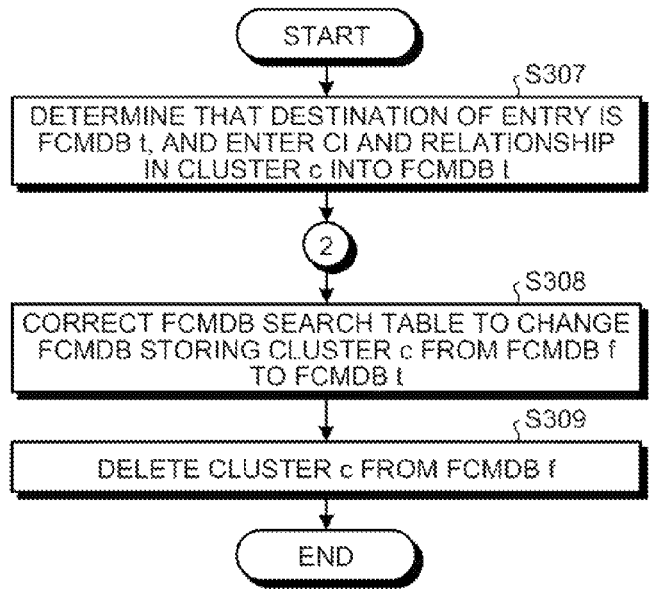
FIG. 20 is a flow diagram illustrating the relocation process of a cluster.
Figure 21:
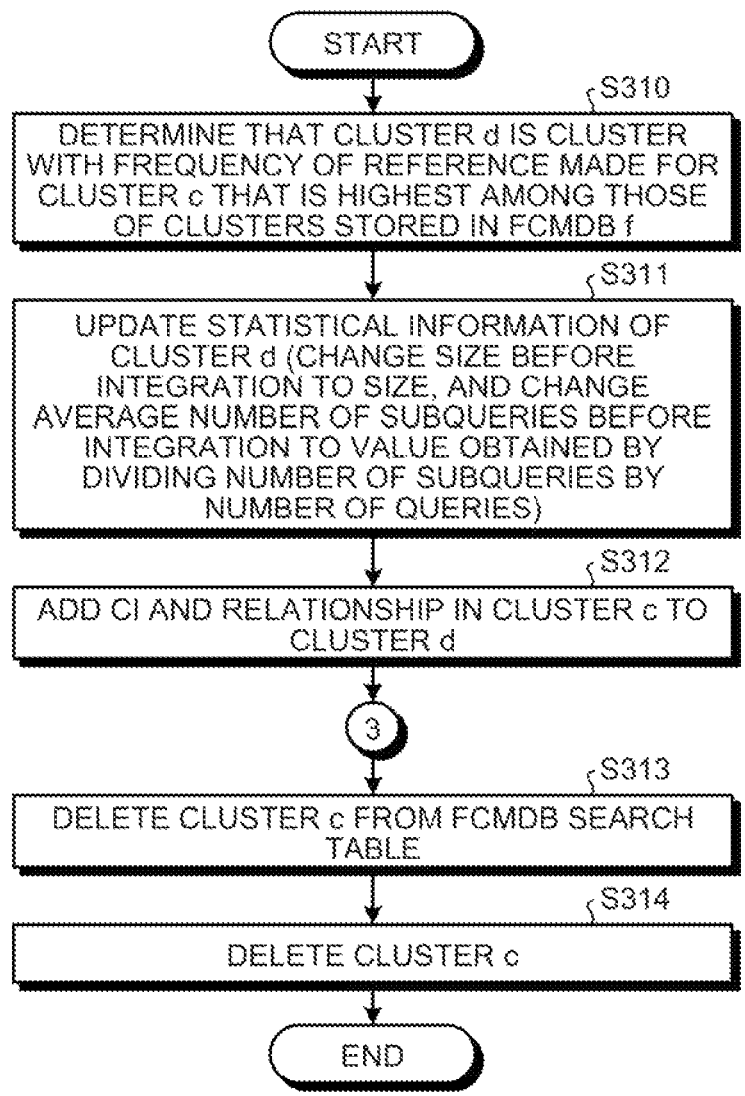
FIG. 21 is a flow diagram illustrating the integration process of clusters.
Figure 22:
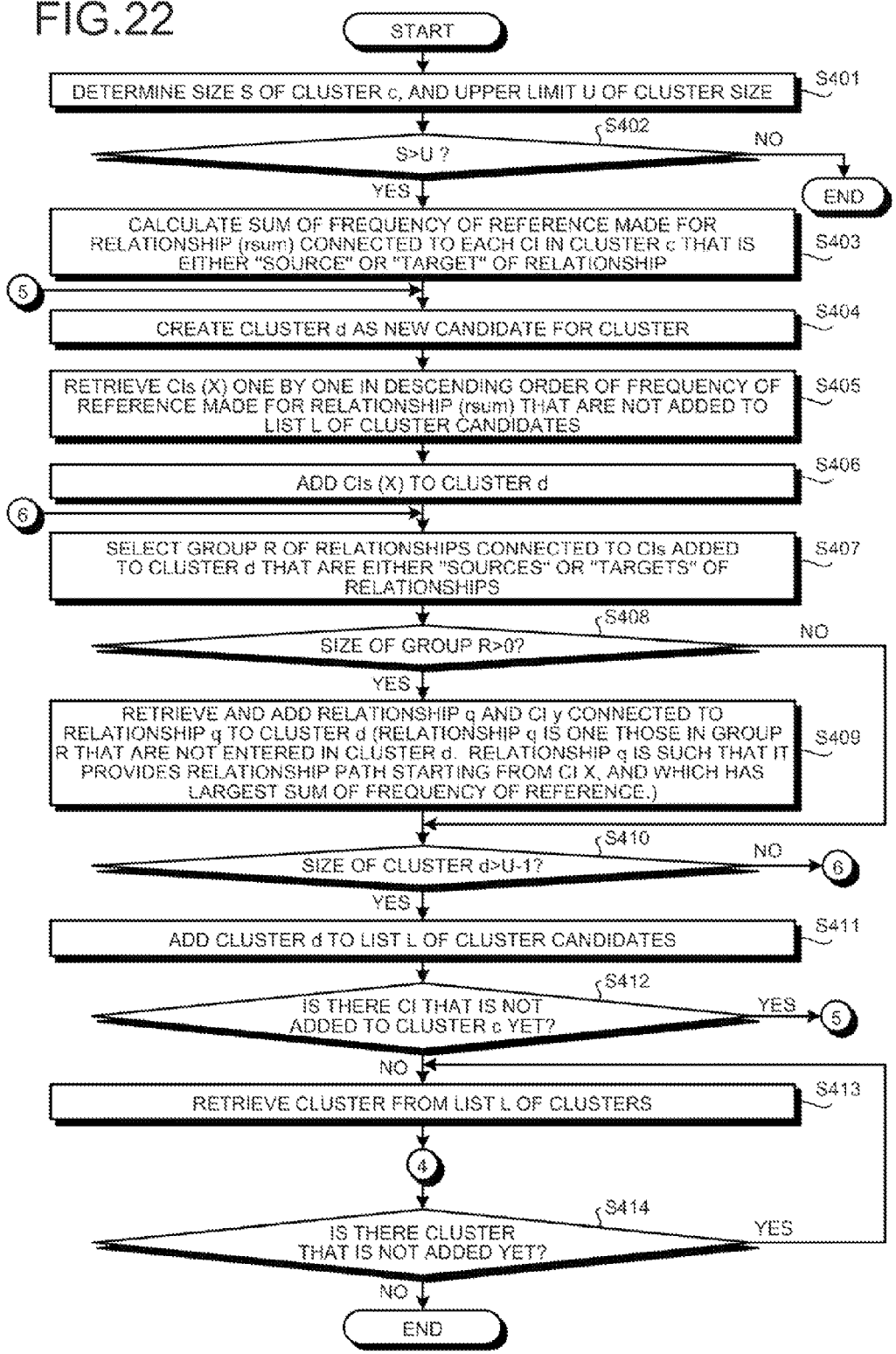
FIG. 22 is a flow diagram illustrating the division process of a cluster.
Figure 23:
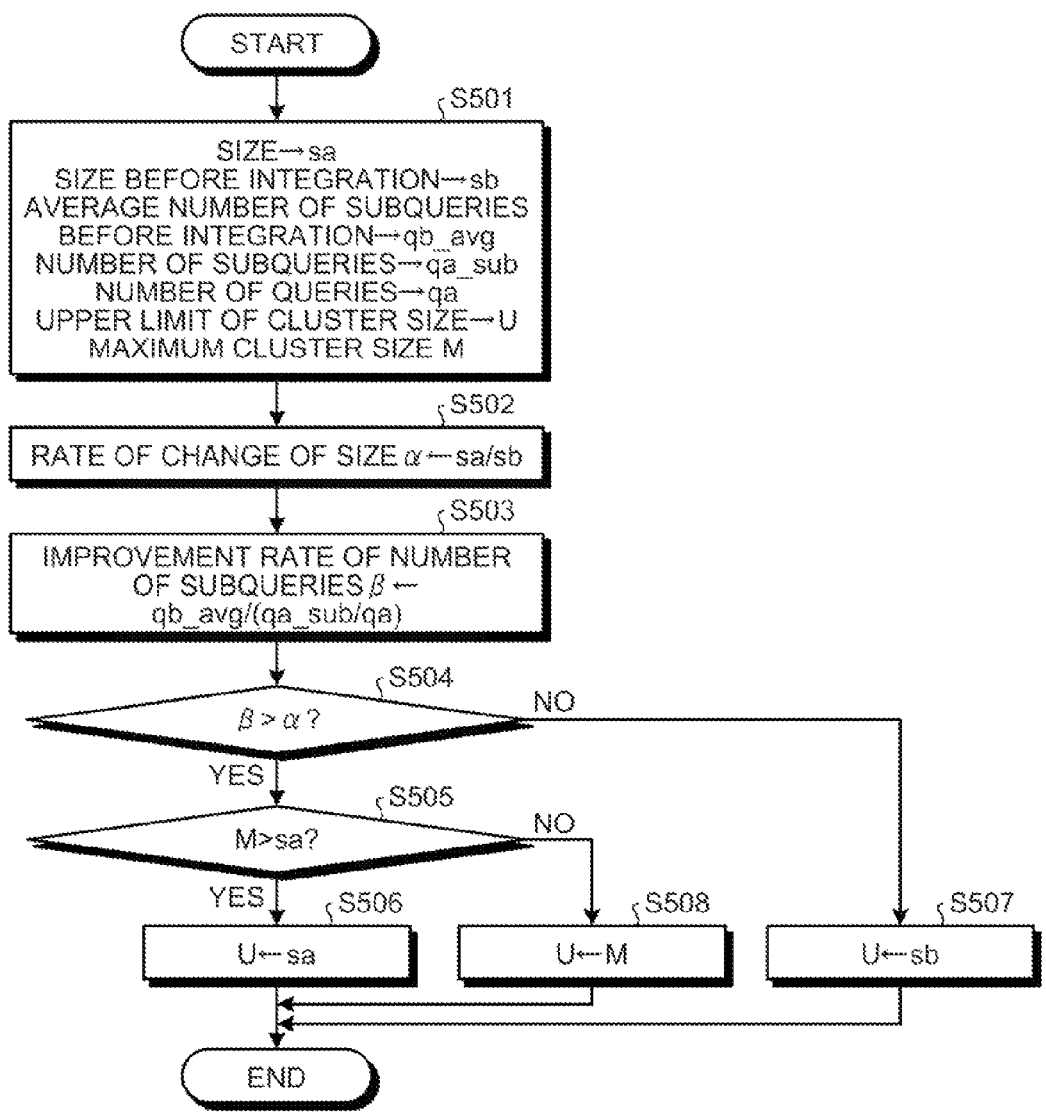
FIG. 23 is a flow diagram illustrating the process for determining the upper limit of a cluster size.
Figure 24:
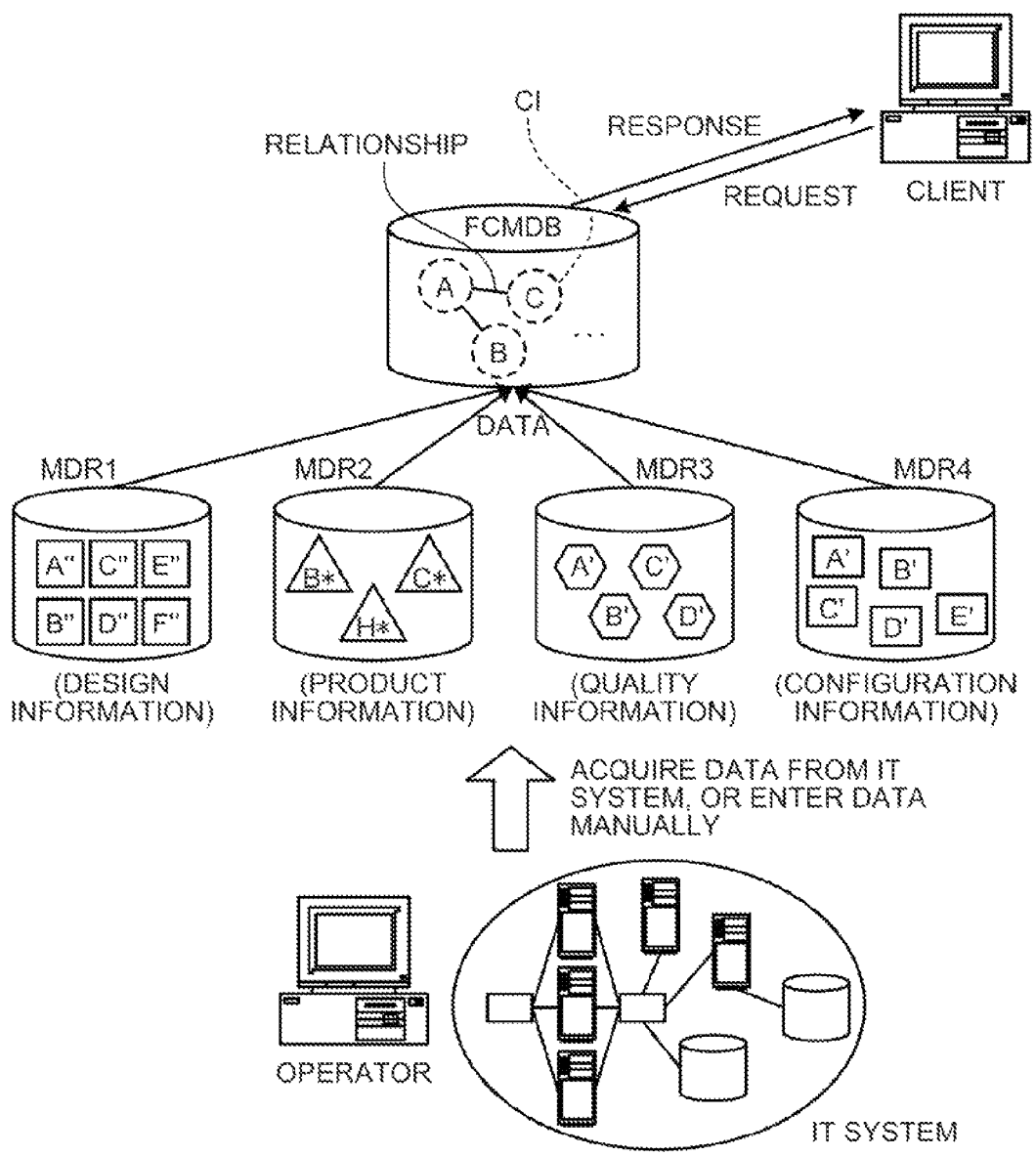
FIG. 24 is a diagram illustrating an FCMDB.
Figure 25:
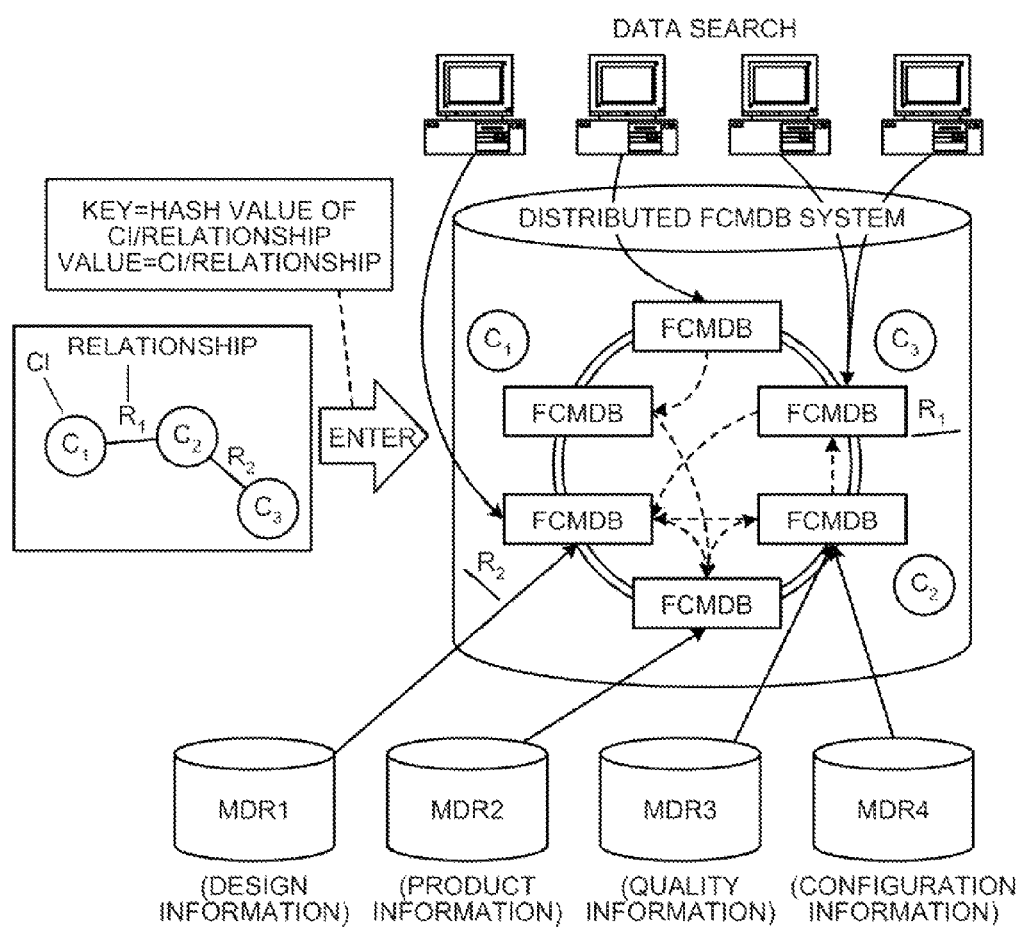
FIG. 25 is a diagram illustrating a distributed FCMDB system.
Figure 26:
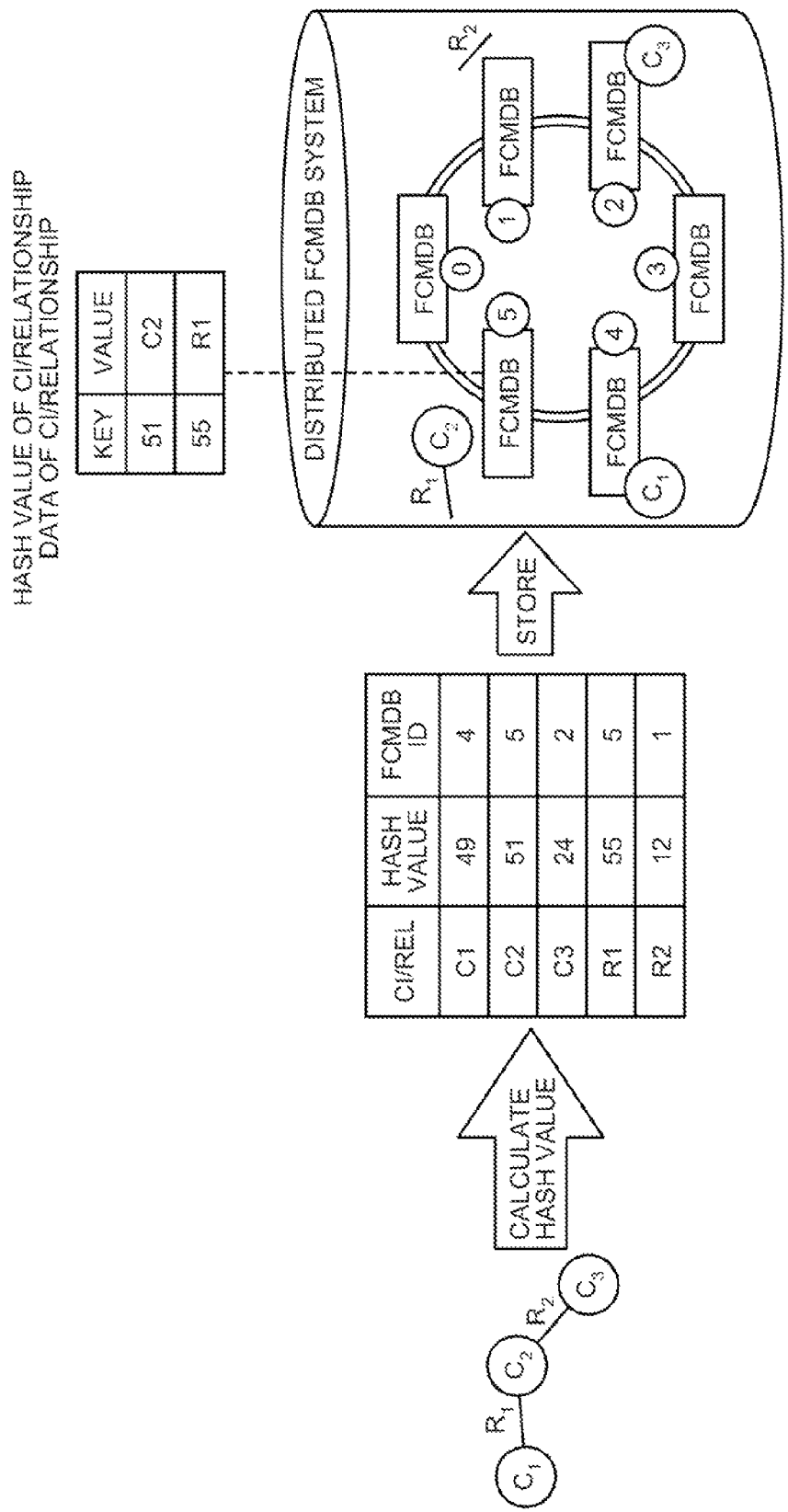
FIG. 26 is a diagram illustrating an entry process in the distributed FCMDB system.
Figure 27:
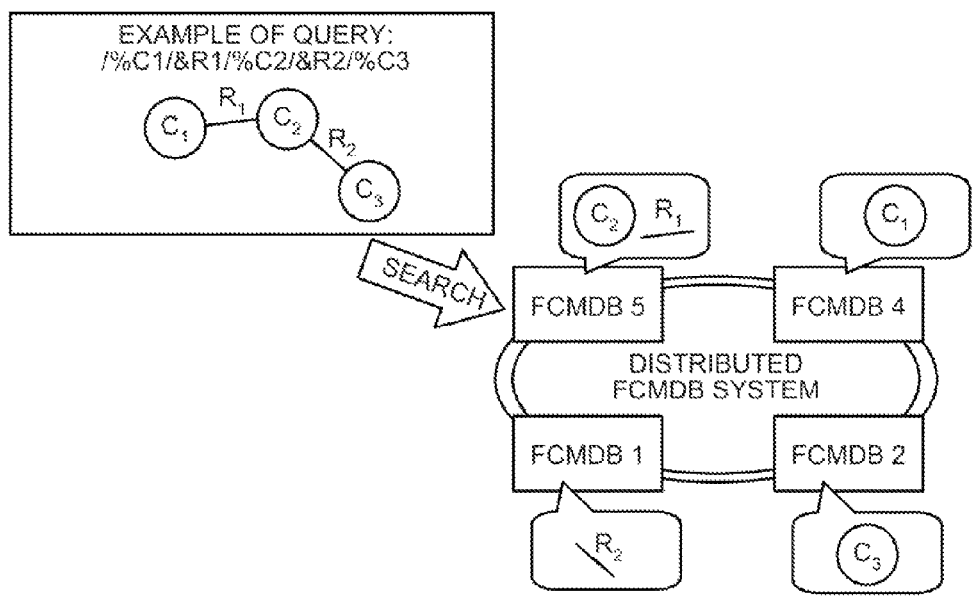
FIG. 27 is a diagram illustrating a search process in a conventional distributed FCMDB system.

The processes by the FCMDB 10 according to the second embodiment will be explained below by using FIGS. 17 to 23. FIG. 17 is a flow diagram illustrating the entry process. FIGS. 18A and 18B are flow diagrams illustrating the search process. FIG. 19 is a flow diagram illustrating a process for determining whether the relocation process of a cluster, or the integration process of clusters is conducted. FIG. 20 is a flow diagram illustrating the relocation process of a cluster. FIG. 21 is a flow diagram illustrating the integration process of clusters. FIG. 22 is a flow diagram illustrating the division process of a cluster. FIG. 23 is a flow diagram illustrating the process for determining the upper limit of a cluster size.

As illustrated in FIG. 17, when a CI/relationship group is received (step S101), the FCMDB 10 searches the cluster search table for a CI that is either a "source" or a "target" of the received relationship (step S102). Then, the FCMDB 10 determines as a result of the search whether a CI as a "source" or a "target" is found in the cluster search table (step S103).

If a CI as a "source" or a "target" is not found in the cluster search table, the FCMDB 10 randomly determines a destination of allocation of the CI/relationship group as an FCMDB (f) (step S104). Next, the FCMDB 10 creates a unique cluster ID (c) from the destination FCMDB (f) and a current time (step S105).

Then, the FCMDB 10 enters the CI/relationship group under the cluster ID (c) into the FCMDB (f) (step S109), and enters each hash value of a CI and a relationship into the cluster search table (step S110). Next, the FCMDB 10 determines whether the cluster (c) is added as a new cluster (step S111). If determining that the cluster (c) is added as a new cluster, the FCMDB 10 completes the process. If determining that the cluster (c) is added as a new cluster, the FCMDB 10 adds correspondence between the cluster ID (c) and the FCMDB ID (f) into the FCMDB search table (step S112).

Referring back to step S103, if a CI as a "source" or a "target" is found in the cluster search table, the FCMDB 10 determines that the ID of a cluster to which the CI found belongs is (c) (step S106). Then, the FCMDB 10 determines from the FCMDB search table that the FCMDB (f) is a place where the cluster (c) is stored (step S107). Next, regarding a relationship the "source" or the "target" CI of which belongs to a cluster other than the cluster (c), the FCMDB 10 finds out a cluster ID and an FCMDB ID to which the CI belongs, and then adds a replica of the relationship (step S108).

Then, the FCMDB 10 enters the CI/relationship group under the cluster ID (c) into the FCMDB (f) (step S109), and enters each hash value of a CI and a relationship into the cluster search table (step S110). Next, the FCMDB 10 determines whether the cluster (c) is added as a new cluster (step S111). If determining that the cluster (c) is not added as a new cluster, the FCMDB 10 completes the process. If determining that the cluster (c) is added as a new cluster, the FCMDB 10 adds correspondence between the cluster ID (c) and the FCMDB ID (f) into the FCMDB search table (step S112).

A procedure of the search process will be explained by using FIGS. 18A and 18B. As illustrated in FIG. 18A, the FCMDB 10 receives a query (step S201) for which a cluster with an ID (c) is targeted, and which is invoked by a cluster with an ID (o). Next, the FCMDB 10 updates a table of the frequency of reference made for cluster (step S202), and processes the received query (step S203).

The FCMDB 10 thereafter updates a table of the frequency of reference made for relationship (step S204), and determines whether the process of the received query is completed (step S205). If the process of the received query is completed, the FCMDB 10 goes to step S211. If the process of the received query is not completed, the FCMDB 10 forms a subquery with the unprocessed portion of the query (step S206).

Next, the FCMDB 10 takes a CI at the beginning of the subquery, and calculates its hash value as (h) (step S207). The FCMDB 10 thereafter determines from the cluster search table that the ID of a cluster is (c) on the basis of the hash value (h) (step S208). Then, the FCMDB 10 determines from the FCMDB search table that the FCMDB ID (f) is a place where the cluster (c) is stored on the basis of the cluster ID (c) (step S209), and transfers the query to the FCMDB (f) (step S210). The FCMDB having received the query starts the procedure from step S201.

After transferring the query, the FCMDB 10 determines whether the FCMDB 10 itself is an FCMDB that received the query from a client (step S211). If the FCMDB 10 itself is the FCMDB that received the query, the FCMDB 10 obtains a result of the query (step S212). Next, the FCMDB 10 updates the cluster statistical information (step S213), and outputs the result of the query to the client (step S214). If the FCMDB 10 itself is not the FCMDB that received the query, the FCMDB 10 transmits the result of the query to an FCMDB having accepted a search request (step S215), and updates cluster statistical information (step S216).

FIG. 19 is a flow diagram illustrating a process for determining whether the relocation process of a cluster, or the integration process of clusters is conducted. As illustrated in FIG. 19, the FCMDB 10 calculates a sum of the frequency of reference made for the cluster (c) by each FCMDB to which each cluster belongs (step S301). Then, the FCMDB 10 specifies an FCMDB (t) as an FCMDB that referred to the cluster (c) with the highest frequency (step S302).

The FCMDB 10 thereafter determines from the FCMDB search table that the FCMDB (f) is a place where the cluster (c) is stored (step S303). Next, the FCMDB 10 determines whether the FCMDB (t) and the FCMDB (f) are the same FCMDB (step S304). If the FCMDB (t) and the FCMDB (f) are not the same FCMDB, the FCMDB 10 proceeds to the relocation process of a cluster (step S305 that will be described in detail by using FIG. 20). If the FCMDB (t) and the FCMDB (f) are the same FCMDB, the FCMDB 10 proceeds to the integration process of clusters (step S306 that will be described in detail by using FIG. 21).

The relocation process of a cluster will be explained by using FIG. 20. As illustrated in FIG. 20, the FCMDB 10 determines that a destination of entry of the cluster (c) is the FCMDB t, and enters a CI and a relationship in the cluster (c) into the FCMDB t (step S307). Next, the FCMDB 10 proceeds to the division process of a cluster (described later in detail by using FIG. 22). The FCMDB 10 thereafter corrects the FCMDB search table to change an FCMDB storing the cluster (c) from the FCMDB (f) to the FCMDB (t) (step S308). Next, the FCMDB 10 deletes the original cluster (c) from the FCMDB (f) (step S309), and then completes the process.

The integration process of clusters will be explained by using FIG. 21. As illustrated in FIG. 21, the FCMDB 10 determines that a cluster (d) is the cluster with a frequency of reference that is highest among those of clusters stored in the FCMDB (f) (step S310). Next, the FCMDB 10 updates the cluster statistical information about the cluster (d), so that a size before integration is changed to a current size, and the average number of subqueries before the integration is changed to a value obtained by dividing the number of subqueries by the number of queries (step S311).

Next, the FCMDB 10 adds the CI and the relationship in the cluster (c) to the cluster (d) (step S312), and proceeds to step S109 for the entry process. The FCMDB 10 thereafter deletes the cluster (c) from the FCMDB search table (step S313), deletes the cluster (c) from the FCMDB (f) (step S314), and then completes the process.

The division process of a cluster will be explained by using FIG. 22. As illustrated in FIG. 22, the FCMDB 10 determines the size S of a cluster (c) and its upper limit U (step S401) to determine whether the size S of the cluster (c) is greater than the upper limit U (step S402). If the size S of the cluster (c) is not greater than the upper limit U, the FCMDB 10 completes the process.

If the size S of the cluster (c) is greater than the upper limit U, the FCMDB 10 calculates a sum of the frequency of reference made for a relationship connected to each CI in the cluster (c) that is either a "source" or a "target" of the relationship (step S403). Next, the FCMDB 10 creates a cluster (d) as a new candidate for a cluster (step S404), and then retrieves CIs (x) one by one in descending order of frequency of reference made for relationship that are not added to a list L of cluster candidates (step S405).

Next, the FCMDB 10 adds the CIs (x) to the cluster (d) (step S406), and then selects a group (R) of relationships connected to the CIs added to the cluster (d) that are either "sources" or "targets" of the relationships (step S407). The FCMDB 10 thereafter determines whether the size of R is greater than zero (step S408). If the size of R is greater than zero, the FCMDB 10 adds a relationship (q) and a CI (y) connected to the relationship (q) to the cluster (d) (step S409). The relationship (q) is such that it provides a relationship path starting from the CI (x), and which has the largest sum of the frequency of reference.

Next, the FCMDB 10 determines whether the size of the cluster (d) is greater than a value (U−1) obtained by subtracting one from the upper limit U (step S410). If the size of the cluster (d) is not greater than the value (U−1), the FCMDB 10 returns to the process in step S407. If the size of the cluster (d) is greater than the value (U−1), the FCMDB 10 adds the cluster (d) to the list L of cluster candidates (step S411). Then, the FCMDB 10 determines if there is a CI that is not added to the cluster (c) yet (step S412).

If there is a CI that is not added to the cluster (c), the FCMDB 10 returns to the process in step S404. If there is no CI that is not added to the cluster (c), the FCMDB 10 retrieves a cluster that is not entered yet from the list L of cluster candidates (step S413). Next, the FCMDB 10 proceeds to step S104 for the entry process. Then, the FCMDB 10 determines whether there is a cluster that is not added yet in the list L of cluster candidates (step S414). If there is a cluster that is not added yet in the list L of cluster candidates, the FCMDB 10 returns to step S413. If there is no cluster that is not added yet in the list L of cluster candidates, the FCMDB 10 completes the process.

The process for determining the upper limit of a cluster size will be described by using FIG. 23. As illustrated in FIG. 23, the FCMDB 10 obtains statistical information about a cluster (step S501). The statistical information mentioned here includes the size of a cluster, the size of the cluster before integration, the average number of subqueries before the integration, the number of subqueries, the number of queries, the upper limit of a cluster size, and a maximum cluster size.

The FCMDB 10 calculate the rate of change α of a size (step S502), and calculates the improvement rate β of the number of subqueries (step S503). Next, the FCMDB 10 determines whether the improvement rate β of the number of subqueries is greater than the rate of change α of a size (step S504). If the improvement rate β of the number of subqueries is not greater than the rate of change α of a size, the FCMDB 10 adjusts the upper limit U so that the upper limit U will be the same as a size sb before integration (step S507).

If the improvement rate β of the number of subqueries is greater than the rate of change α of a size, the FCMDB 10 determines whether a maximum cluster size M is greater than a cluster size sa (step S505). If the maximum cluster size M is greater than the cluster size sa, the FCMDB 10 adjusts the upper limit U so that the upper limit U will be the same as the cluster size sa (step S506), and then completes the process. If the maximum cluster size M is not greater than the cluster size sa, the FCMDB 10 adjusts the upper limit U so that the upper limit U will be the same as the maximum cluster size M (step S508), and then completes the process.

Effect of Second Embodiment

As described above, the FCMDB 10 includes the local data storing unit 14 that stores a CI indicative of information about a target of management, and a relationship indicative of information about a connection between CIs independently of a different FCMDB. When a request to enter a cluster is accepted that is a group of a CI and a relationship connected together, the FCMDB 10 determines a destination to store the cluster, and controls to cause the local data storing unit 14 or a different FCMDB to store the cluster. When a search request to search for a CI or a relationship is accepted, the FCMDB 10 specifies a place where a cluster including the target of the search is stored, and retrieves the CI or the relationship targeted for the search from the storage place of the cluster. This reduces the number of communications between FCMDBs in a search process, so that a processing speed in the search process is increased.

In the second embodiment, if the frequency of reference made across a plurality of clusters in a search process is equal to or larger than a predetermined threshold, and if the plurality of clusters are stored in different FCMDBs, the FCMDB 10 relocates the clusters such that the clusters are placed in the same FCMDB. This means that clusters, among which subqueries are issued frequently, namely among which search is conducted frequently, are stored in the same FCMDB according to the frequency of reference. This reduces the number of subqueries transmitted through a network, so that a processing speed in the search process is increased.

In the second embodiment, if the frequency of reference made across a plurality of clusters in a search process is equal to or larger than a predetermined threshold, and if the plurality of clusters are stored in the same FCMDB, the FCMDB 10 integrates the clusters. This means that clusters, among which subqueries are issued frequently, namely among which search is conducted frequently, are integrated into one cluster according to the frequency of reference. This reduces the number of subqueries transmitted through a network, so that a processing speed in the search process is increased.

In the second embodiment, if the size of a cluster determined by the number of CIs and relationships in the cluster exceeds its upper limit, the FCMDB 10 divides the cluster according to the frequency of reference made for a relationship in the cluster. Thus, the size of a cluster is optimized if it is too large. This contributes to distribution of queries, so that a processing speed in related search is increased.

In the second embodiment, the FCMDB 10 defines the upper limit of a cluster size according to correspondence between a reduced number of times a search process is conducted across clusters, and an increased number of CIs and relationships in the clusters. This means that the upper limit of a cluster size is adjusted according to a degree of reduction of the number of subqueries. This contributes to distribution of queries while reducing the number of subqueries, so that a processing speed in related search is increased.

[c] Third Embodiment

Various different embodiments of the invention may be devised in addition to the aforementioned first and second embodiments. A third embodiment as one of other embodiments of the invention will be described below.

(1) System Structure and Others

The constituting units in the devices illustrated in the drawings are functionally conceptual units, and the physical structures thereof are not necessarily limited to those illustrated in the drawings. More specifically, the details of distribution or integration of the devices are not limited to those illustrated in the drawings. Part of or all of the devices may functionally and physically be distributed or integrated in any units according to various burdens, condition of use and the like.

By way of example, the data entry service processing unit 11 and the cluster search table storing unit 12 may be integrated.

(2) Program

The distributed information management method described above can be realized by causing a computer such as a personal computer and a work station to execute a previously prepared program. This program may be distributed through a network such as the Internet. Or, this program may be stored in a computer-readable recording medium such as a hard disk, a flexible disk (FD), a CD-ROM, an MO, and a DVD. In this case, the program may be executed after being read from the recording medium by a computer.

According to one aspect of each of a configuration information management device, a distributed information management system, a distributed information management method, and a distributed information management program of the invention, the number of communications between FCMDBs in a search process is reduced, so that a processing speed in the search process is increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A configuration information management device that manages configuration information of an IT system, comprising:

a configuration information memory stores a configuration item of the IT system indicative of information about a target of management, and an item relationship indicative of information about a connection between the configuration items independently of a different configuration information management device;

a storage controlling unit, when one of a plurality of configuration information management devices accepts a request to enter a cluster that is configuration information about one IT system including a group of the configuration item of the IT system and the item relationship connected together, determines a destination to store the cluster from among the plurality of configuration information management devices, and controls to cause the configuration information memory of the configuration information management device determined to store the cluster, the configuration item indicating information including design information, product information, quality information and configuration information about the IT system;

a search processing unit, when a search request to search for the configuration item or the item relationship is accepted, specifies a place where a cluster containing the target of the search is stored and retrieves the configuration item or the item relationship targeted for the search from the storage place of the cluster;

an upper limit defining unit that defines an upper limit of a cluster size according to correspondence between a reduced number of times a search process is conducted across the clusters, and an increased number of configuration items and the item relationships in the clusters; and a cluster dividing unit, when a size of a cluster determined by the number of the configuration item and the item relationship in the cluster exceeds its upper limit, divides the cluster according to a frequency of reference made for the item relationship in the cluster, wherein the search processing unit calculates a sum of the frequency of reference.

2. The configuration information management device according to claim 1, further comprising a cluster relocation processor that relocates a plurality of clusters such that the clusters are placed in the same configuration information management device when a frequency of reference made across the plurality of clusters in a search process is equal to or larger than a predetermined threshold, and when the plurality of clusters are stored in different configuration information management devices, wherein the search processing unit calculates a sum of the frequency of reference.

3. The configuration information management device according to claim 1, further comprising a cluster integrating unit that integrates a plurality of clusters when a frequency of reference made across the plurality of clusters in a search process is equal to or larger than a predetermined threshold, and when the plurality of clusters are stored in the same configuration information management device, wherein the search processing unit calculates a sum of the frequency of reference.

4. A distributed information management system that manages configuration information of an IT system, comprising a plurality of configuration information management devices each of which separately stores configuration items of the IT system indicative of information about a target of management, and item relationships indicative of information about connections between the configuration items, the configuration information management devices each comprising:

a configuration information memory stores one of the configuration items and one of the item relationships independently of a different one of the configuration information management devices;

a storage controlling unit, when one of the plurality of configuration information management devices accepts a request to enter a cluster that is configuration information about one IT system including a group of the configuration item of the IT system and the item relationship connected together, determines a destination to store the cluster from among the plurality of configuration information management devices, and controls to cause the configuration information memory of the configuration information management device determined to store the cluster, the configuration item indicating information including design information, product information, quality information and configuration information about the IT system;

a search processing unit, when a search request to search for the configuration item or the item relationship is accepted, specifies a place where a cluster containing the target of the search is stored and retrieves the configuration item or the item relationship targeted for the search from the storage place of the cluster;

an upper limit defining unit that defines an upper limit of a cluster size according to correspondence between a reduced number of times a search process is conducted across the clusters, and an increased number of configuration items and the item relationships in the clusters; and a cluster dividing unit, when a size of a cluster determined by the number of the configuration item and the item relationship in the cluster exceeds its upper limit, divides the cluster according to a frequency of reference made for the item relationship in the cluster, wherein the search processing unit calculates a sum of the frequency of reference.

5. A distributed information management method for managing configuration information of an IT system, the method comprising:

when one of a plurality of configuration information management devices accepts a request to enter a cluster is accepted that is configuration information about one IT system including a group of a configuration item of the IT system, and an item relationship indicative of information about a connection between configuration items and connected to the configuration item, determining a destination to store the cluster from among the plurality of configuration information management devices, and controlling to cause a configuration information storage unit of the configuration information management device determined to store the cluster, the configuration information storage unit storing a configuration item and an item relationship independently of the different configuration information management device, the configuration item indicating information including design information, product information, quality information and configuration information about the IT system;

when a search request to search for the configuration item or the item relationship is accepted, specifying a place where a cluster containing the target of the search is stored, and retrieving the configuration item or the item relationship targeted for the search from the storage place of the cluster;

defining an upper limit of a cluster size according to correspondence between a reduced number of times a search process is conducted across the clusters, and an increased number of configuration items and the item relationships in the clusters; and when a size of a cluster determined by the number of the configuration item and the item relationship in the cluster exceeds its upper limit, dividing the cluster according to a frequency of reference made for the item relationship in the cluster, wherein the search processing unit calculates a sum of the frequency of reference.

6. A computer-readable, non-transitory medium storing a distributed information management program for managing configuration information of an IT system, the program causing a computer to execute a process comprising:

when one of a plurality of configuration information management devices accepts a request to enter a cluster is accepted that is configuration information about one IT system including a group of a configuration item of the IT system, and an item relationship indicative of information about a connection between configuration items and connected to the configuration item, determining a destination to store the cluster from among the plurality of configuration information management devices, and controlling to cause a configuration information storage unit of the configuration information management device determined to store the cluster, the configuration information storage unit storing a configuration item and an item relationship independently of the different configuration information management device, the configuration item indicating information including design information, product information, quality information and configuration information about the IT system;

when a search request to search for the configuration item or the item relationship is accepted, specifying a place where a cluster containing the target of the search is stored, and retrieving the configuration item or the item relationship targeted for the search from the storage place of the cluster;

defining an upper limit of a cluster size according to correspondence between a reduced number of times a search process is conducted across the clusters, and an increased number of configuration items and the item relationships in the clusters; and when a size of a cluster determined by the number of the configuration item and the item relationship in the cluster exceeds its upper limit, dividing the cluster according to a frequency of reference made for the item relationship in the cluster, wherein the search processing unit calculates a sum of the frequency of reference.

* * * * *